United States Patent
Joboji et al.

(10) Patent No.: US 8,670,042 B2
(45) Date of Patent: Mar. 11, 2014

(54) BLINKING-SIGNAL DETECTING DEVICE

(75) Inventors: Tasuku Joboji, Hamamatsu (JP);
Yukinobu Sugiyama, Hamamatsu (JP)

(73) Assignee: Hamamatsu Photonics K.K.,
Hamamatsu-shi, Shizuoka (JP)

(*) Notice: Subject to any disclaimer, the term of this patent is extended or adjusted under 35 U.S.C. 154(b) by 0 days.

(21) Appl. No.: 13/379,479

(22) PCT Filed: Jul. 20, 2010

(86) PCT No.: PCT/JP2010/062175
§ 371 (c)(1),
(2), (4) Date: Dec. 20, 2011

(87) PCT Pub. No.: WO2011/013538
PCT Pub. Date: Feb. 3, 2011

(65) Prior Publication Data
US 2012/0098997 A1    Apr. 26, 2012

(30) Foreign Application Priority Data
Jul. 30, 2009    (JP) .................................. 2009-177876

(51) Int. Cl.
H04N 9/73    (2006.01)
H04N 5/335    (2011.01)

(52) U.S. Cl.
USPC .................. 348/226.1; 348/297; 348/312

(58) Field of Classification Search
USPC ............ 348/226.1, 227.1, 228.1, 229.1, 296, 348/297, 312
See application file for complete search history.

(56) References Cited

U.S. PATENT DOCUMENTS

| | | | |
|---|---|---|---|
| 5,790,295 A | 8/1998 | Devon | |
| 7,561,190 B2* | 7/2009 | Deng et al. | 348/226.1 |
| 8,081,235 B2* | 12/2011 | Kishi et al. | 348/226.1 |
| 2009/0073295 A1* | 3/2009 | Sugiyama et al. | 348/302 |
| 2009/0122155 A1 | 5/2009 | Kishi et al. | |
| 2009/0268067 A1* | 10/2009 | Sugiyama et al. | 348/294 |
| 2011/0096193 A1* | 4/2011 | Egawa | 348/226.1 |
| 2012/0086852 A1* | 4/2012 | Beer-Gingold et al. | 348/447 |

FOREIGN PATENT DOCUMENTS

| | | |
|---|---|---|
| JP | 2007-28080 | 2/2007 |
| JP | 2007-202579 | 8/2007 |
| JP | 2007-324705 | 12/2007 |
| JP | 2009-124238 | 6/2009 |
| JP | 2009-294876 | 12/2009 |
| JP | 2009-296037 | 12/2009 |
| WO | 2009/107636 | 9/2009 |
| WO | WO 2011/013548 | 2/2011 |

* cited by examiner

*Primary Examiner* — Nhan T Tran
*Assistant Examiner* — Chan Nguyen
(74) *Attorney, Agent, or Firm* — Drinker Biddle & Reath LLP

(57) ABSTRACT

A blinking-signal device 1 includes a light receiving section 10, a row selecting section 20, a readout section 30, a detecting section 40, and a control section 50. By the row selecting section 20, charge generated in its photodiode of each pixel unit $P_{2i-1,n}$ of the (2i−1)-th row in the light receiving section 10 is accumulated in its charge accumulating section during a first period, and charge generated in its photodiode of each pixel unit $P_{2i,n}$ of the 2i-th row in the light receiving section 10 is accumulated in its charge accumulating section during a second period. With the detecting section 40, it is detected whether or not light reaching the pixel units $P_{2i-1,n}$ and $P_{2i,n}$ is a blinking signal on the basis of a difference between data $D_{2i-1,n}$ and $D2_{i,n}$ of the pixel units $P_{2i-1,n}$ and $P_{2i}$ output from the readout section 30.

3 Claims, 14 Drawing Sheets

*Fig.5*
(a)
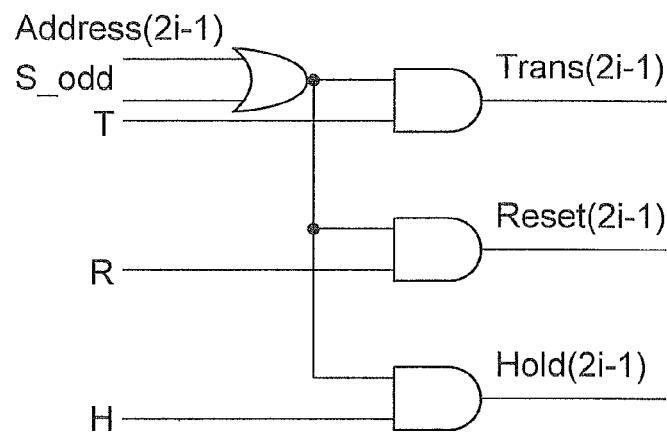
(b)
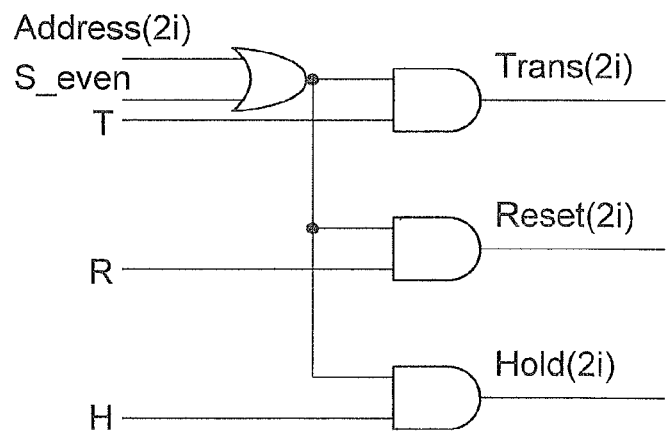

US 8,670,042 B2

BLINKING-SIGNAL DETECTING DEVICE

TECHNICAL FIELD

The present invention relates to a blinking-signal detecting device.

BACKGROUND ART

A solid-state image pickup device includes a light receiving section where M×N pixel units $P_{1,1}$ to $P_{M,N}$ each including a photodiode and a charge accumulating section are two-dimensionally arrayed in M rows and N columns, a row selecting section that causes each pixel unit $P_{m,n}$ in a light receiving section to accumulate charge generated in its photodiode during a given period in its charge accumulating section, and to output data corresponding to an amount of the charge accumulated in each pixel unit $P_{m,n}$ in every row, and a readout section for which the data output from each pixel unit $P_{m,n}$ in the light receiving section is input and from which data corresponding to an amount of charge generated in the photodiode of each pixel unit $P_{m,n}$ is output. Also, in some cases, the solid-state image pickup device further includes an AD conversion section that analog/digital-converts the data output from the readout section to output a digital value.

Such a solid-state image pickup device is capable of detecting an intensity of light reaching each pixel unit $P_{m,n}$ in its light receiving section, to perform image pickup. Further, in recent years, not only image pickup, but an attempt has been made to perform optical communication by using such a solid-state image pickup device. For example, in the invention disclosed in Patent Literature 1, it is detected whether or not a temporal intensity change of each of all pixel units in its light receiving section is a predetermined pattern on the basis of image data obtained by image pickup with the solid-state image pickup device, and it is specified that pixel units whose temporal intensity changes are judged as the predetermined pattern have received an optical signal. Then, data from the specified pixel units are considered as optical signal data, thereby performing optical communication.

CITATION LIST

Patent Literature

Patent Literature 1: Japanese Patent Application Laid Open No. 2007-324705

SUMMARY OF INVENTION

Technical Problem

In the invention disclosed in Patent Literature 1, a high-capacity storage section for storing image data of a plurality of frames is required in order to specify a pixel unit receiving an optical signal among M×N pixel units in its light receiving section. Further, in the invention disclosed in Patent Literature 1, it is necessary that a blinking pattern of the optical signal be known in order to specify a pixel unit receiving an optical signal.

The present invention has been made in order to solve the above-described problems. An object of the present invention is to provide a blinking-signal detecting device which is capable of specifying a pixel unit receiving a blinking signal such as an optical signal without a high-capacity storage section, and without a blinking pattern of an optical signal being known.

Solution to Problem

A blinking-signal detecting device according to the present invention includes (1) a light receiving section where M×N pixel units $P_{1,1}$ to $P_{M,N}$ each including a photodiode that generates charge of an amount according to an incident light amount, a charge accumulating section in which the charge is accumulated, and a switch for outputting data corresponding to an accumulated charge amount in the charge accumulating section are two-dimensionally arrayed in M rows and N columns, (2) a row selecting section in which a first period and a second period having a common temporal width are set in tandem, the row selecting section causes each pixel unit $P_{2i-1,n}$ of a (2i−1)-th row in the light receiving section to accumulate charge generated in the photodiode in the charge accumulating section during the first period, and causes each pixel unit $P_{2i,n}$ of a 2i-th row in the light receiving section to accumulate charge generated in the photodiode in the charge accumulating section during the second period, and selects each row in the light receiving section after the first period and the second period, to close the switch of each pixel unit $P_{m,n}$ of every row so as to output data corresponding to an accumulated charge amount in the charge accumulating section, (3) a readout section for which data output from each pixel unit $P_{m,n}$ of each row in the light receiving section selected by the row selecting section is input, and from which data $D_{m,n}$ corresponding to an amount of charge generated in the photodiode of each pixel unit $P_{m,n}$ is output, and (4) a detecting section for which each data $D_{m,n}$ output from the readout section is input, the detecting section detects whether or not light reaching the pixel units $P_{2i-1,n}$ and $P_{2i,n}$ is a blinking signal on the basis of a difference between data $D_{2i-1,n}$ and $D_{2i,n}$ (provided that M and N are each an integer not less than 2, m is an integer not less than 1 and not more than M, and n is an integer not less than 1 and not more than N, and i is an integer not less than 1 and not more than (M/2)).

In the blinking-signal detecting device according to the present invention, by the row selecting section, the first period and the second period having a common temporal width are set in tandem, charge generated in the photodiode of each pixel unit $P_{2i-1,n}$ of the (2i−1)-th row in the light receiving section is accumulated in the charge accumulating section during the first period, charge generated in the photodiode of each pixel unit $P_{2i,n}$ of a 2i-th row in the light receiving section is accumulated in the charge accumulating section during the second period, and each row in the light receiving section is selected after the first period and the second period, to close the switch of each pixel unit $P_{m,n}$ of every row so as to output data corresponding to an accumulated charge amount in the charge accumulating section. With the readout section, data output from each pixel unit $P_{m,n}$ of each row in the light receiving section selected by the row selecting section is input thereto, and data $D_{m,n}$ corresponding to an amount of charge generated in the photodiode of each pixel unit $P_{m,n}$ is output therefrom. Then, with the detecting section, each data $D_{m,n}$ output from the readout section is input thereto, and it is detected whether or not light reaching the pixel units $P_{2i-1,n}$ and $P_{2i,n}$ is a blinking signal on the basis of a difference between data $D_{2i-1,n}$ and $D_{2i,n}$.

In the blinking-signal detecting device according to the present invention, the row selecting section may select the (2i−1)-th row and the 2i-th row in tandem in the light receiving section, and the readout section may output data $D_{2i-1,n}$ and data $D_{2i,n}$ in tandem. It is more preferable that, in the blinking-signal detecting device according to the present invention, (a) the row selecting section simultaneously select the (2i−1)-th row and the 2i-th row in the light receiving section, to output data corresponding to an accumulated charge amount in the charge accumulating section of each pixel unit $P_{2i-1,n}$ of the (2i−1)-th row, and to output data corresponding to an accumulated charge amount in the charge accumulating section of each pixel unit $P_{2i,n}$ of the 2i-th row, (b) the readout section simultaneously output data $D_{2i-1,n}$ corresponding to an amount of charge generated in the photodiode of each pixel unit $P_{2i-1,n}$ of the (2i−1)-th row, and data $D_{2i,n}$ corresponding to an amount of charge generated in the photodiode of each pixel unit $P_{2i,n}$ of the 2i-th row, and (c) the detecting section carry out a calculation of a difference between the data $D_{2i-1,n}$ and $D_{2i}$ simultaneously output from the readout section. In addition, a first row selecting section and a second row selecting section may be provided as row selecting sections, and a first readout section and a second readout section may be provided as readout sections, an operation for reading out data of each pixel unit $P_{2i-1,n}$ of the (2i−1)-th row may be performed by the first row selecting section and the first readout section, an operation for reading out data of each pixel unit $P_{2i,n}$ of the 2i-th row may be performed by the second row selecting section and the second readout section, and the data readout operation by the first row selecting section and the first readout section and the data readout operation by the second row selecting section and the second readout section may be performed in parallel with each other.

Alternatively, a blinking-signal detecting device according to the present invention includes (1) a light receiving section where M×N pixel units $P_{1,1}$ to $P_{M,N}$ each including a photodiode that generates charge of an amount according to an incident light amount, a charge accumulating section in which the charge is accumulated, and a switch for outputting data corresponding to an accumulated charge amount in the charge accumulating section are two-dimensionally arrayed in M rows and N columns, (2) a row selecting section in which first to fourth periods having a common temporal width are set in order, the row selecting section causes each pixel unit $P_{4j-3,n}$ of a (4j−3)-th row in the light receiving section to accumulate charge generated in the photodiode in the charge accumulating section during the first period, causes each pixel unit $P_{4j-2,n}$ of a (4j−2)-th row in the light receiving section to accumulate charge generated in the photodiode in the charge accumulating section during the second period, causes each pixel unit $P_{4j-1,n}$ of a (4j−1)-th row in the light receiving section to accumulate charge generated in the photodiode in the charge accumulating section during the third period, causes each pixel unit $P_{4j,n}$ of a 4j-th row in the light receiving section to accumulate charge generated in the photodiode in the charge accumulating section during the fourth period, and selects each row in the light receiving section after the fourth period, to close the switch of each pixel unit $P_{m,n}$ of every row so as to output data corresponding to an accumulated charge amount in the charge accumulating section, (3) a readout section for which data output from each pixel unit $P_{m,n}$ of each row in the light receiving section selected by the row selecting section is input, and from which data $D_{m,n}$ corresponding to an amount of charge generated in the photodiode of each pixel unit $P_{m,n}$ is output, and (4) a detecting section for which each data $D_{m,n}$ output from the readout section is input, the detecting section detects whether or not light reaching the pixel units $P_{4j-3,n}$, $P_{4j-2,n}$, $P_{4j-1,n}$, and $P_{4j,n}$ is a blinking signal on the basis of a sum of a difference between data $D_{4j-3,n}$ and $D_{4j-1,n}$ and a difference between data $D_{4j-2,n}$ and $D_{4j,n}$ (provided that M and N are each an integer not less than 2, m is an integer not less than 1 and not more than M, n is an integer not less than 1 and not more than N, and j is an integer not less than 1 and not more than (M/4)).

In the blinking-signal detecting device according to the present invention, by the row selecting section, the first to fourth periods having a common temporal width are set in order, charge generated in the photodiode of each pixel unit $P_{4j-3,n}$ of the (4j−3)-th row in the light receiving section is accumulated in the charge accumulating section during the first period, charge generated in the photodiode of each pixel unit $P_{4j-2,n}$ of the (4j−2)-th row in the light receiving section is accumulated in the charge accumulating section during the second period, charge generated in the photodiode of each pixel unit $P_{4j-1,n}$ of the (4j−1)-th row in the light receiving section is accumulated in the charge accumulating section during the third period, charge generated in the photodiode of each pixel unit $P_{4j,n}$ of the 4j-th row in the light receiving section is accumulated in the charge accumulating section during the fourth period, and each row in the light receiving section is selected after the fourth period, to close the switch of each pixel unit $P_{m,n}$ of every row so as to output data corresponding to an accumulated charge amount in the charge accumulating section. With the readout section, data output from each pixel unit $P_{m,n}$ of each row in the light receiving section selected by the row selecting section is input thereto, and data $D_{m,n}$ corresponding to an amount of charge generated in the photodiode of each pixel unit $P_{m,n}$ is output therefrom. Then, with the detecting section, each data $D_{m,n}$ output from the readout section is input thereto, and it is detected whether or not light reaching the pixel units $P_{4j-3,n}$, $P_{4j-2,n}$, $P_{4j-1,n}$, and $P_{4j,n}$ is a blinking signal on the basis of a sum of a difference between data $D_{4j-3,n}$ and $D_{4j-1,n}$ and a difference between data $D_{4j-2,n}$ and $D_{4j,n}$.

Advantageous Effects of Invention

The blinking-signal detecting device according to the present invention is capable of specifying a pixel unit receiving a blinking signal such as an optical signal without a high-capacity storage section, and without a blinking pattern of an optical signal being known.

BRIEF DESCRIPTION OF DRAWINGS

FIG. 5 are diagrams showing parts of a configuration of a row selecting section 20 of the blinking-signal detecting device 1 according to the first embodiment.

DESCRIPTION OF EMBODIMENTS

Figure 1:
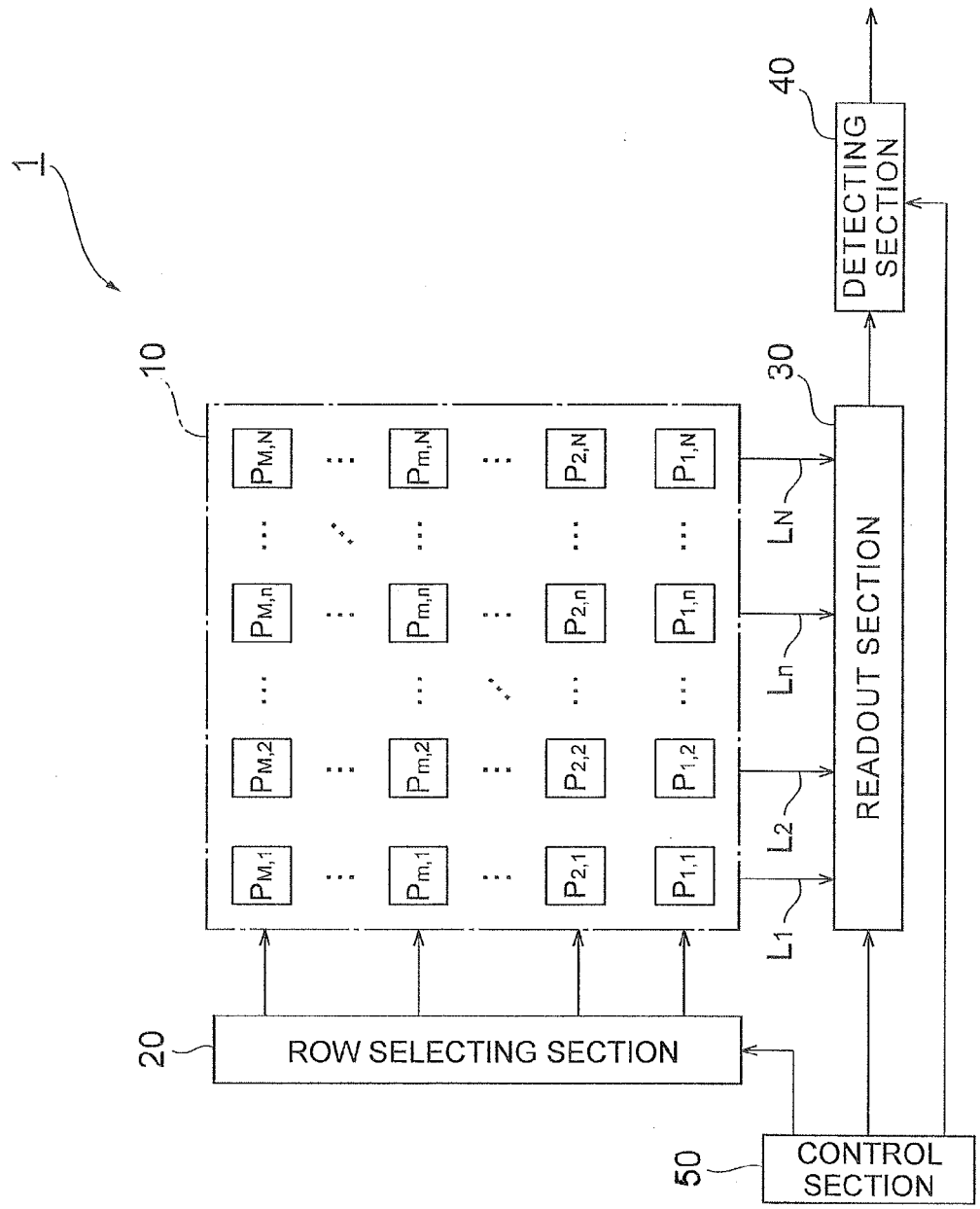
FIG. 1 is a diagram showing a schematic configuration of a blinking-signal detecting device 1 according to a first embodiment.

Hereinafter, embodiments of the present invention will be described in detail with reference to the accompanying drawings. Also, the same components will be denoted with the same reference numerals in the description of the drawings, and overlapping description will be omitted.

First Embodiment

FIG. 1 is a diagram showing a schematic configuration of a blinking-signal detecting device 1 according to a first embodiment. The blinking-signal detecting device 1 shown in this figure includes a light receiving section 10, a row selecting section 20, a readout section 30, a detecting section 40, and a control section 50.

The light receiving section 10 includes M×N pixel units $P_{1,1}$ to $P_{M,N}$. The M×N pixel units $P_{1,1}$ to $P_{M,N}$ have a common configuration, and these are two-dimensionally arrayed in M rows and N columns. Each pixel unit $P_{m,n}$ is located in the m-th row and the n-th column. Here, M and N are each an integer not less than 2, and m is an integer not less than 1 and not more than M, and n is an integer not less than 1 and not more than N.

Each pixel unit $P_{m,n}$ has a photodiode that generates charge of an amount according to an incident light amount and a charge accumulating section in which the charge is accumulated. Each pixel unit $P_{m,n}$ accumulates charge generated in its photodiode in its charge accumulating section on the basis of various control signals received via control signal lines from the row selecting section 20, and outputs data corresponding to the accumulated charge amount in the charge accumulating section to a readout signal line $L_n$.

The row selecting section 20 outputs various control signals for controlling the operation of each pixel unit $P_{m,n}$ in the light receiving section 10. In more detail, the row selecting section 20 causes each pixel unit $P_{2i-1,n}$ of the (2i−1)-th row in the light receiving section 10 to accumulate charge generated in the photodiode in the charge accumulating section during a first period. Further, the row selecting section 20 causes each pixel unit $P_{2i,n}$ of the 2i-th row in the light receiving section 10 to accumulate charge generated in the photodiode in the charge accumulating section during a second period. Then, the row selecting section 20 selects each row in the light receiving section 10 after the first period and the second period, and causes each pixel unit $P_{m,n}$ of every row to output data corresponding to an accumulated charge amount in the charge accumulating section. Here, the first period and the second period are periods in tandem, having a common temporal width, and i is an integer not less than 1 and not more than (M/2).

The readout section 30 is connected to N readout signal lines $L_1$ to $L_N$, and allows data output from each pixel unit $P_{m,n}$ of the m-th row in the light receiving section 10 selected by the row selecting section 20 to the readout signal line $L_n$ to be input thereto, and outputs data $D_{m,n}$ corresponding to an amount of charge generated in its photodiode of each pixel unit $P_{m,n}$ of the m-th row to the detecting section 40.

The detecting section 40 allows each data $D_{m,n}$ output from the readout section 30 to be input thereto, and detects whether or not light reaching the pixel units $P_{2i-1,n}$ and $P_{2i,n}$ is a blinking signal on the basis of a difference between the data $D_{2i-1,n}$ and $D_{2i,n}$.

The control section 50 controls respective operations of the row selecting section 20, the readout section 30, and the detecting section 40, to control the entire operation of the blinking-signal detecting device 1. In more detail, the control section 50 controls transmission of various control signals to the light receiving section 10 in the row selecting section 20, input of data from each pixel unit $P_{m,n}$ in the readout section 30, output of each data $D_{m,n}$ in the readout section 30, processing in the detecting section 40, and respective operational timings.

Figure 2:
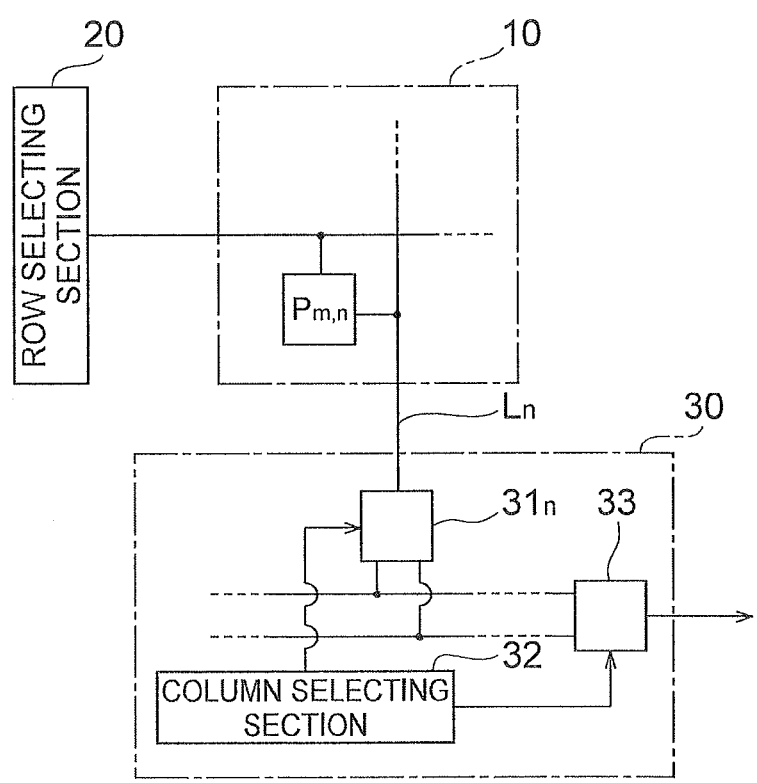
FIG. 2 is a diagram showing a configuration of a readout section of the blinking-signal detecting device 1 according to the first embodiment.

FIG. 2 is a diagram showing a configuration of the readout section 30 of the blinking-signal detecting device 1 according to the first embodiment. In this figure, the pixel unit $P_{m,n}$ of the m-th row and the n-th column is shown as a representative of the M×N pixel units $P_{1,1}$ to $P_{M,N}$ in the light receiving section 10. Further, constitutional elements relating to the pixel unit $P_{m,n}$ are shown in the readout section 30.

The readout section 30 includes N holding sections $31_1$ to $31_N$, a column selecting section 32, and a difference arithmetic section 33. The N holding sections $31_1$ to $31_N$ have a common configuration. Each holding section $31_n$ is connected to M pixel units $P_{1,n}$ to $P_{M,n}$ of the n-th column in the light receiving section 10 via the readout signal line $L_n$, and allows data output from the pixel unit $P_{m,n}$ of the m-th row selected by the row selecting section 20 to the readout signal line $L_n$ to be input thereto, to hold the data, and is capable of outputting the held data. Each holding section $31_n$ preferably allows data of signal components superimposed with noise components to be input thereto, to hold the data, and for allowing data of only noise components to be input thereto, to hold the data.

The N holding sections $31_1$ to $31_N$ are capable of sampling data at a same timing on the basis of various control signals received from the column selecting section 32 to hold the sampled data, and sequentially output the held data. The difference arithmetic section 33 allows the data sequentially output from the respective N holding sections $31_1$ to $31_N$ to be input thereto, and subtracts the data of only noise components from the data of signal components superimposed with noise components, to output data $D_{m,n}$ corresponding to the signal components. The difference arithmetic section 33 may output the data corresponding to the signal components as analog data, or may have an AD conversion function to output digital data. In this way, the readout section 30 is capable of outputting data $D_{m,n}$ corresponding to an amount of charge generated in the photodiode of each pixel unit $P_{m,n}$ of the m-th row.

Figure 3:
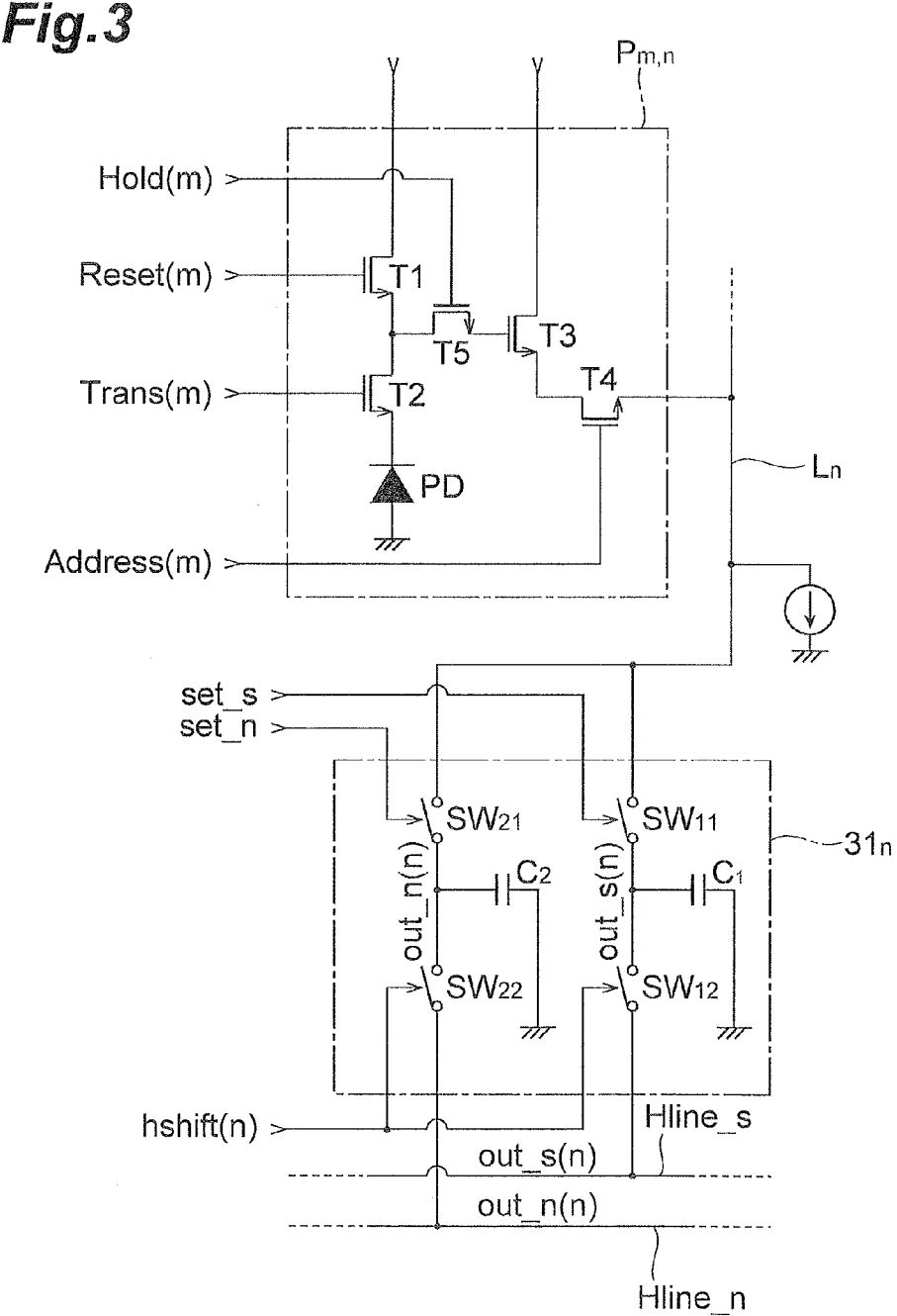
FIG. 3 is a diagram showing circuit configurations of a pixel unit $P_{m,n}$ and a holding section $31_n$ of the blinking-signal detecting device 1 according to the first embodiment.

FIG. 3 is a diagram showing circuit configurations of the pixel unit $P_{m,n}$ and the holding section $31_n$ of the blinking-signal detecting device 1 according to the first embodiment. In this figure as well, the pixel unit $P_{m,n}$ of the m-th row and the n-th column is shown as a representative of the M×N pixel units $P_{1,1}$ to $P_{M,N}$ in the light receiving section 10. Further, the holding section $31_n$ relating to the pixel unit $P_{m,n}$ is shown in the readout section 30.

Each pixel unit $P_{m,n}$ is of the APS (Active Pixel Sensor) type, that includes a photodiode PD and 5 MOS transistors T1, T2, T3, T4, and T5. As shown in this figure, the transistor T1, the transistor T2, and the photodiode PD are sequentially connected in series, and a reference voltage is input to the drain terminal of the transistor T1, and the anode terminal of the photodiode PD is grounded. The connection point between the transistor T1 and the transistor T2 is connected to the gate terminal of the transistor T3 via the transistor T5.

A reference voltage is input to the drain terminal of the transistor T3. The source terminal of the transistor T3 is connected to the drain terminal of the transistor T4. The source terminal of the transistor T4 of each pixel unit $P_{m,n}$ is connected to the readout signal line $L_n$. A constant current source is connected to the readout signal line $L_n$.

A Reset(m) signal output from the row selecting section 20 is input to the gate terminal of the transistor T1 for reset in each pixel unit $P_{m,n}$. A Trans(m) signal output from the row selecting section 20 is input to the gate terminal of the transistor T2 for transfer in each pixel unit $P_{m,n}$. A Hold(m) signal output from the row selecting section 20 is input to the gate terminal of the transistor T5 for hold in each pixel unit $P_{m,n}$. An Address(m) signal output from the row selecting section 20 is input to the gate terminal of the transistor T4 for output selection in each pixel unit $P_{m,n}$. These control signals (Reset (m) signal, Trans(m) signal, Hold(m) signal, and Address (m) signal) are input in common to the N pixel units $P_{m,1}$ to $P_{m,N}$ of the m-th row from the row selecting section 20.

When the Reset(m) signal, the Trans(m) signal, and the Hold(m) signal are at a high level, the junction capacitance section of the photodiode PD is discharged, and further, the diffusion region (the charge accumulating section) connected to the gate terminal of the transistor T3 is discharged. When the Trans(m) signal is at a low level, the charge generated in the photodiode PD is accumulated in the junction capacitance section. When the Reset(m) signal is at a low level and the Trans(m) signal and the Hold(m) signal are at a high level, the charge accumulated in the junction capacitance section of the photodiode PD is transferred to the diffusion region (the charge accumulating section) connected to the gate terminal of the transistor T3 to be accumulated therein.

When the Address (m) signal is at a high level, data (data of signal components superimposed with noise components) corresponding to an amount of the charge accumulated in the diffusion region (the charge accumulating section) connected to the gate terminal of the transistor T3 is output to the readout signal line $L_n$ via the transistor T4. That is, the transistor T4 operates as a switch for outputting data corresponding to an accumulated charge amount in the charge accumulating section to the readout signal line $L_n$. In addition, when the charge accumulating section is in a state of discharge, data of only noise components is output to the readout signal line $L_n$ via the transistor T4.

Each holding section $31_n$ includes two capacitive elements $C_1$ and $C_2$, and four switches $SW_{11}$, $SW_{12}$, $SW_{21}$, and $SW_{22}$. In this holding section $31_n$, the switch $SW_{11}$ and the switch $SW_{12}$ are connected in series to be provided between the readout signal line $L_n$ and a wiring Hline_s, and one terminal of the capacitive element $C_1$ is connected to the connection point between the switch $SW_{11}$ and the switch $SW_{12}$, and the other terminal of the capacitive element $C_1$ is grounded. Further, the switch $SW_{21}$ and the switch $SW_{22}$ are connected in series to be provided between the readout signal line $L_n$ and a wiring Hline_n, and one terminal of the capacitive element $C_2$ is connected to the connection point between the switch $SW_{21}$ and the switch $SW_{22}$, and the other terminal of the capacitive element $C_2$ is grounded.

In this holding section $31_n$, the switch $SW_{11}$ opens and closes according to a level of a set_s signal supplied from the column selecting section 32. The switch $SW_{21}$ opens and closes according to a level of a set_n signal supplied from the column selecting section 32. The set_s signal and the set_n signal are input in common to the N holding sections $31_1$ to $31_N$. The switches $SW_{12}$ and $SW_{22}$ open and close according to a level of an hshift(n) signal supplied from the column selecting section 32.

In this holding section $31_n$, when the set_n signal is shifted from a high level to a low level and the switch $SW_{21}$ opens, the noise components output from the pixel unit $P_{m,n}$ to the readout signal line $L_n$ are thereafter held as a voltage value out_n(n) by the capacitive element $C_2$. When the set_s signal is shifted from a high level to a low level and the switch $SW_{11}$ opens, the signal components superimposed with noise components output from the pixel unit $P_{m,n}$ to the readout signal line $L_n$ are thereafter held as a voltage value out_s(n) by the capacitive element $C_1$. Then, when the hshift(n) signal is shifted to a high level, the switch $SW_{12}$ is closed to output the voltage value out_s(n) held by the capacitive element $C_1$ to the wiring Hline_s, and the switch $SW_{22}$ is closed to output the voltage value out_n(n) held by the capacitive element $C_2$ to the wiring Hline_n. A difference between these voltage value out_s(n) and voltage value out_n(n) represents a voltage value corresponding to an amount of charge generated in its photodiode PD of the pixel unit $P_{m,n}$.

Figure 4:
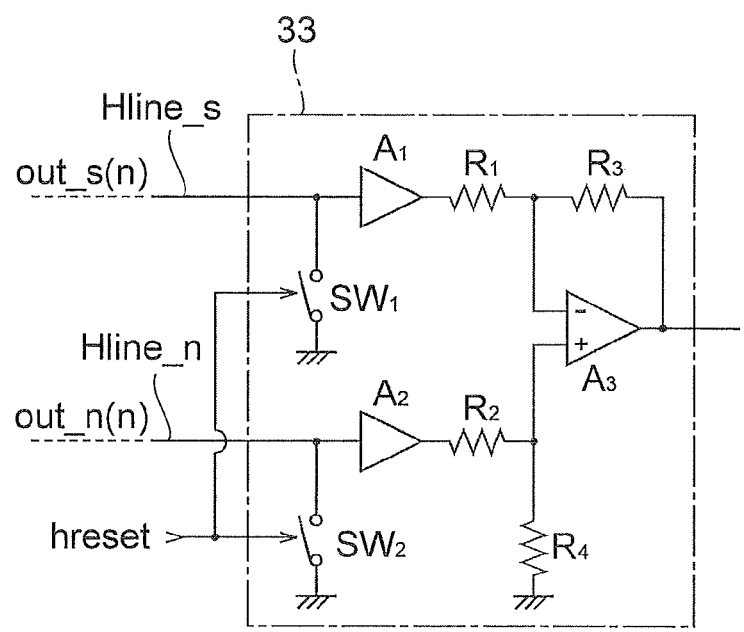
FIG. 4 is a diagram showing a circuit configuration of a difference arithmetic section 33 of the blinking-signal detecting device 1 according to the first embodiment.

FIG. 4 is a diagram showing a circuit configuration of the difference arithmetic section 33 of the blinking-signal detecting device 1 according to the first embodiment. As shown in this figure, the difference arithmetic section 33 includes amplifiers $A_1$ to $A_3$, switches $SW_1$ and $SW_2$, and resistors $R_1$ to $R_4$. The inverting input terminal of the amplifier $A_3$ is connected to the output terminal of the buffer amplifier $A_1$ via the resistor $R_1$, and is connected to its own output terminal via the resistor $R_3$. The non-inverting input terminal of the amplifier $A_3$ is connected to the output terminal of the buffer amplifier $A_2$ via the resistor $R_2$, and is connected to a grounding potential via the resistor $R_4$. The input terminal of the buffer amplifier $A_1$ is connected to the N holding sections $31_1$ to $31_N$ via the wiring Hline_s, and is connected to a grounding potential via the switch $SW_1$. The input terminal of the buffer amplifier $A_2$ is connected to the N holding sections $31_1$ to $31_N$ via the wiring Hline_n, and is connected to a grounding potential via the switch $SW_2$.

The switches $SW_1$ and $SW_2$ in the difference arithmetic section 33 are controlled by an hreset signal supplied from the column selecting section 32 to carry out an opening and closing operation. When the switch $SW_1$ is closed, the voltage value input to the input terminal of the buffer amplifier $A_1$ is reset. When the switch $SW_2$ is closed, the voltage value input to the input terminal of the buffer amplifier $A_2$ is reset. When the switches $SW_1$ and $SW_2$ are open, the voltage values out_s (n) and out_n(n) output to the wirings Hline_s and Hline_n from any holding section $31_n$ among the N holding sections $31_1$ to $31_N$ are input to the input terminals of the buffer amplifiers $A_1$ and $A_2$. Assuming that the respective gains of the buffer amplifiers $A_1$ and $A_2$ are 1, and the respective resistance values of the four resistors $R_1$ to $R_4$ are equal to one another, a voltage value output from the output terminal of the difference arithmetic section 33 represents a difference between the voltage values respectively input via the wiring Hline_s and the wiring Hline_n, that is the value from which noise components are eliminated.

FIG. 5 are diagrams showing parts of a configuration of the row selecting section 20 of the blinking-signal detecting device 1 according to the first embodiment. The row selecting section 20 not only has an M-staged shift register, but also a circuit shown in the figure (a) with respect to each odd-numbered row (the (2i−1)-th row), and a circuit shown in the figure (b) with respect to each even-numbered row (the 2i-th row). The M-staged shift register outputs an Address(m) signal from the m-th stage among the stages to provide the signal to each pixel unit $P_{m,n}$ of the m-th row.

As shown in the figure (a), a Trans(2i−1) signal is produced as a logical conjunction of a logical disjunction of an Address (2i−1) signal and an S_odd signal, with a T signal. A Reset (2i−1) signal is produced as a logical conjunction of a logical disjunction of an Address(2i−1) signal and an S_odd signal, with an R signal. A Hold(2i−1) signal is produced as a logical conjunction of a logical disjunction of an Address(2i−1) signal and an S_odd signal, with an H signal. These Trans(2i−1) signal, Reset(2i−1) signal, and Hold(2i−1) signal are provided to each pixel unit $P_{2i-1,n}$ of the (2i−1)-th row.

As shown in the figure (b), a Trans(2i) signal is produced as a logical conjunction of a logical disjunction of an Address (2i) signal and an S_even signal, with a T signal. A Reset(2i) signal is produced as a logical conjunction of a logical disjunction of an Address(2i) signal and an S_even signal, with an R signal. A Hold(2i) signal is produced as a logical conjunction of a logical disjunction of an Address(2i) signal and an S_even signal, with an H signal. These Trans(2i) signal, Reset(2i) signal, and Hold(2i) signal are provided to each pixel unit $P_{2i,n}$ of the 2i-th row.

The S_odd signal, the S_even signal, the R signal, the T signal, and the H signal are provided to the row selecting section 20 from the control section 50. The row selecting section 20 configured in this way is capable of causing each pixel unit $P_{2i-1,n}$ of the (2i−1)-th row in the light receiving section 10 to accumulate charge generated in the photodiode in the charge accumulating section during a first period instructed by the S_odd signal. Further, the row selecting section 20 is capable of causing each pixel unit $P_{2i,n}$ of the 2i-th row in the light receiving section 10 to accumulate charge generated in the photodiode in the charge accumulating section during a second period instructed by the S_even signal. Then, the row selecting section 20 selects each row in the light receiving section 10 by the Address(m) signal after the first period and the second period, and is capable of causing each pixel unit $P_{m,n}$ of every row to output data corresponding to an accumulated charge amount in the charge accumulating section to the readout signal line $L_n$.

Figure 6:
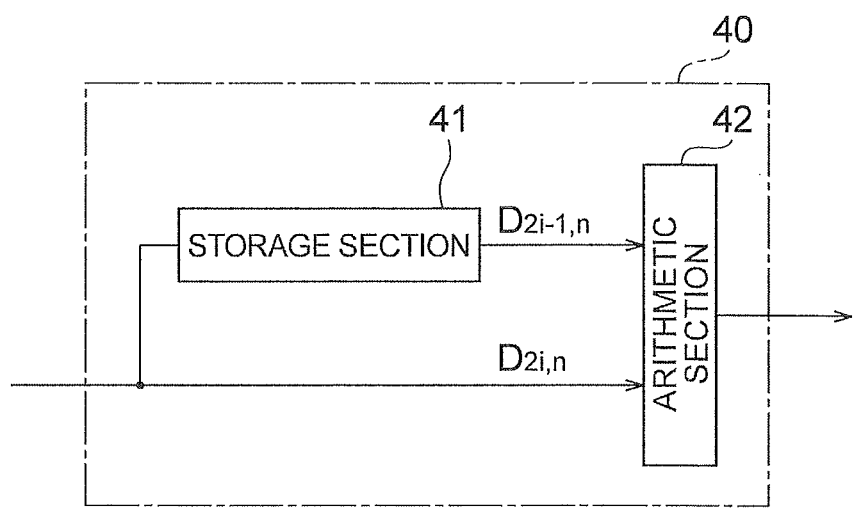
FIG. 6 is a diagram showing a configuration of a detecting section 40 of the blinking-signal detecting device 1 according to the first embodiment.

FIG. 6 is a diagram showing a configuration of the detecting section 40 of the blinking-signal detecting device 1 according to the first embodiment. The detecting section 40 allows each data $D_{m,n}$ output in order of the rows from the readout section 30 to be input thereto. The detecting section 40 includes a storage section 41 and an arithmetic section 42. The storage section 41 stores N data $D_{2i-1,n}$ of the (2i−1)-th row previously input among the N data $D_{2i-1,n}$ of the (2i−1)-th row and the N data $D_{2i,n}$ of the 2i-th row. The arithmetic section 42 allows the N data $D_{2i,n}$ of the 2i-th row later input to be input thereto, and allows the N data $D_{2i-1,n}$ of the (2i−1)-th row stored by the storage section 41 to be input thereto, to carry out a calculation of a difference $(D_{2i-1,n} - D_{2i,n})$ between these data $D_{2i-1,n}$ and $D_{2i,n}$. Then, the detecting section 40 detects whether or not light reaching the pixel units $P_{2i-1,n}$ and $P_{2i,n}$ is a blinking signal on the basis of the difference $(D_{2i-1,n} - D_{2i,n})$. Here, the data to be held in the storage section 41 are not limited to digital data, and may be held as a mode of an analog voltage, and its difference may be taken.

Figure 7:
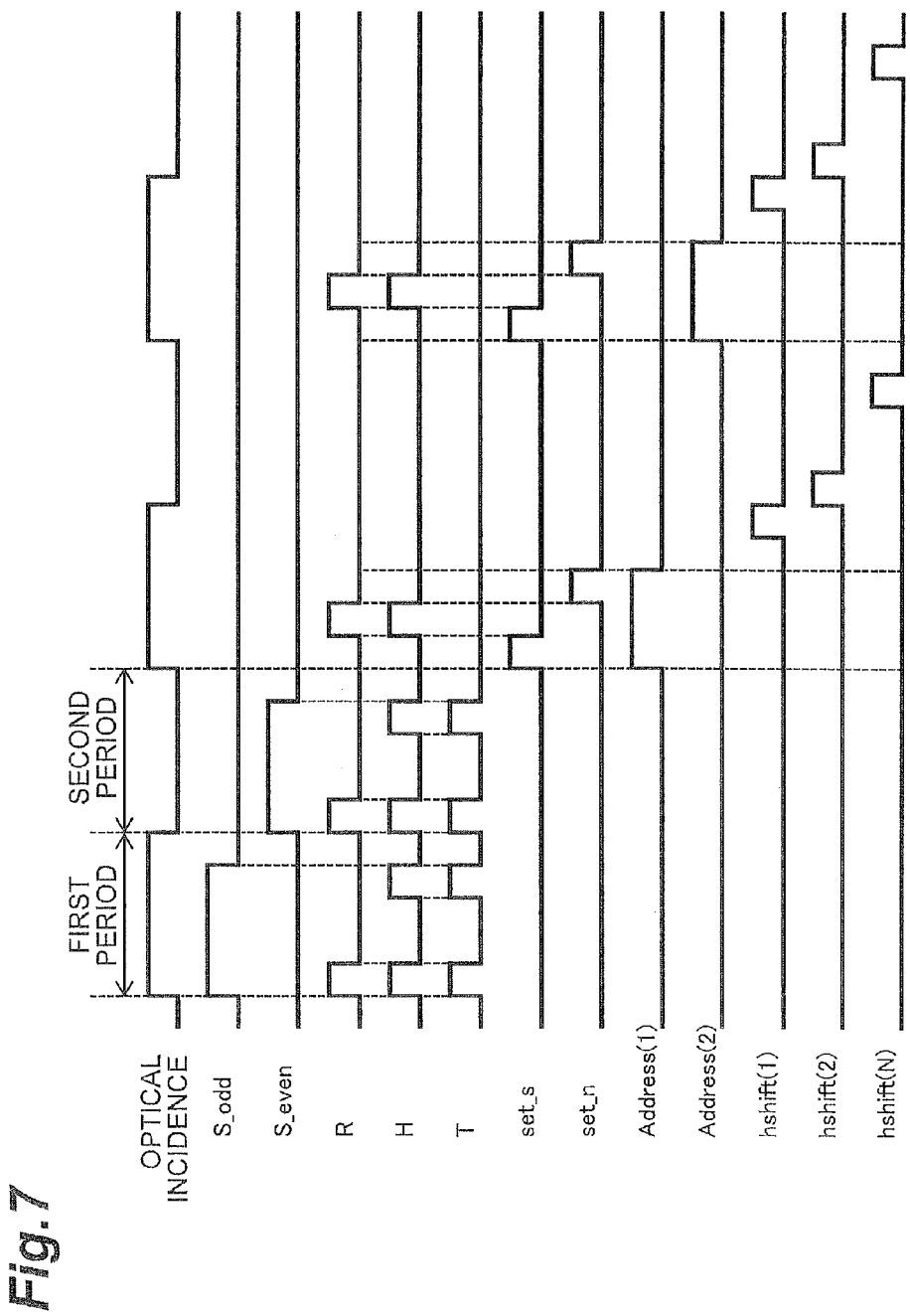
FIG. 7 is a timing chart showing an example of the operation of the blinking-signal detecting device 1 according to the first embodiment.

FIG. 7 is a timing chart showing an example of the operation of the blinking-signal detecting device 1 according to the first embodiment. This figure shows, in order from the top, the presence or absence of optical signal incidence to the light receiving section 10 of the blinking-signal detecting device 1, the S_odd signal, the S_even signal, the R signal, the T signal and the H signal which are provided from the control section 50 to the row selecting section 20, the set_s signal and the set_n signal provided from the column selecting section 32 to each holding section $31_n$ in the readout section 30, the Address(1) signal provided from the row selecting section 20 to each pixel unit $P_{1,n}$ of the first row, the Address(2) signal provided from the row selecting section 20 to each pixel unit $P_{2,n}$ of the second row, and the hshift(1) signal to hshift(N) signal provided from the column selecting section 32 to each holding section $31_n$ in the readout section 30.

During the first period for which an optical signal is incident upon the light receiving section 10, the S_odd signal is shifted to a high level, and the S_even signal is shifted to a low level. During a given period in this first period, the R signal, the T signal, and the H signal are shifted to a high level, the Reset(2i−1) signal, the Trans(2i−1) signal, and the Hold(2i−1) signal are shifted to a high level, and the junction capacitance section of the photodiode PD is discharged in each pixel unit $P_{2i-1,n}$ of the (2i−1)-th row, and further, the diffusion region (the charge accumulating section) connected to the gate terminal of the transistor T3 is discharged. For the following given period in this first period, the R signal, the T signal, and the H signal are shifted to a low level, the Reset (2i−1) signal, the Trans(2i−1) signal, and the Hold(2i−1) signal are shifted to a low level, and the charge generated in the photodiode PD is accumulated in the junction capacitance section in each pixel unit $P_{2i-1,n}$ of the (2i−1)-th row. Then, for the next following given period in the first period, the R signal is at a low level and the T signal and the H signal are shifted to a high level, the Reset(2i−1) signal is shifted to a low level, and the Trans(2i−1) signal and the Hold(2i−1) signal are shifted to a high level, and the charge accumulated in the junction capacitance section of the photodiode PD is transferred to the diffusion region (the charge accumulating section) connected to the gate terminal of the transistor T3 to be accumulated therein in each pixel unit $P_{2i-1,n}$ of the (2i−1)-th row. These operations are carried out in parallel in each pixel unit of all the odd-numbered rows in the light receiving section 10.

During the second period for which no optical signal is incident upon the light receiving section 10, the S_odd signal is shifted to a low level, and the S_even signal is shifted to a high level. During a given period in this second period, the R signal, the T signal, and the H signal are shifted to a high level, the Reset(2i) signal, the Trans(2i) signal, and the Hold(2i) signal are shifted to a high level, and the junction capacitance section of the photodiode PD is discharged in each pixel unit $P_{2i,n}$ of the 2i-th row, and further, the diffusion region (the charge accumulating section) connected to the gate terminal of the transistor T3 is discharged. For the following given period in this second period, the R signal, the T signal, and the H signal are shifted to a low level, the Reset(2i) signal, the Trans(2i) signal, and the Hold(2i) signal are shifted to a low level, and the charge generated in the photodiode PD is accumulated in the junction capacitance section in each pixel unit $P_{2i,n}$ of the 2i-th row. Then, for the next following given period in the second period, the R signal is at a low level and the T signal and the H signal are shifted to a high level, the Reset(2i)

signal is shifted to a low level, and the Trans(2i) signal and the Hold(2i) signal are shifted to a high level, and the charge accumulated in the junction capacitance section of the photodiode PD is transferred to the diffusion region (the charge accumulating section) connected to the gate terminal of the transistor T3 to be accumulated therein in each pixel unit $P_{2i,n}$ of the 2i-th row. These operations are carried out in parallel in each pixel unit of all the even-numbered rows in the light receiving section 10.

After the first period and the second period, the Address(1) signal provided from the row selecting section 20 to each pixel unit $P_{1,n}$ of the first row is shifted to a high level. During the period for which the Address(1) signal is at a high level, the set_s signal provided to each holding section $31_n$ is shifted to a high level only for a given period, and next, the R signal and the T signal are shifted to a high level only for a given period, and the charge accumulating section of each pixel unit $P_{1,n}$ of the first row is discharged, and further, next, the set_n signal provided to each holding section $31_n$ is shifted to a high level only for a given period. Thereby, the signal components superimposed with the noise components output from each pixel unit $P_{1,n}$ to the readout signal line $L_n$ are held as a voltage value out_s(n) by the capacitive element $C_1$ in the holding section $31_n$. Further, the noise components output from each pixel unit $P_{1,n}$ to the readout signal line $L_n$ are held as a voltage value out_n(n) by the capacitive element $C_2$ in the holding section $31_n$. Thereafter, the hshift(1) signal to the hshift(N) signal are sequentially shifted to a high level, the voltage values held in the respective holding sections $31_1$ to $31_N$ are sequentially output, the data of only the noise components is subtracted from the data of the signal components superimposed with the noise components by the difference arithmetic section 33, and the data $D_{1,1}$ to $D_{1,N}$ corresponding to the signal components of each pixel unit $P_{1,n}$ of the first row are output. In the same way after that, data $D_{m,n}$ of each pixel unit $P_{m,n}$ of each row is output in order of the rows.

Then, in the detecting section 40, first, data $D_{m,n}$ of each pixel unit $P_{1,n}$ of the first row is input to be stored by the storage section 41. Next, when data $D_{2,n}$ of each pixel unit $P_{2,n}$ of the second row is input, the data $D_{2,n}$ is input to the arithmetic section 42 and the data $D_{1,n}$ stored by the storage section 41 is input to the arithmetic section 42, and a calculation of a difference ($D_{1,n}$–$D_{2,n}$) between these data $D_{1,n}$ and $D_{2,n}$ is carried out in the arithmetic section 42. Then, in the detecting section 40, it is detected whether or not light reaching the pixel units $P_{1,n}$ and $P_{2,n}$ is a blinking signal on the basis of the difference ($D_{1,n}$–$D_{2,n}$).

Then, in the detecting section 40, data $D_{3,n}$ of each pixel unit $P_{3,n}$ of the third row is input to be stored by the storage section 41. Next, when data $D_{4,n}$ of each pixel unit $P_{4,n}$ of the fourth row is input, the data $D_{4,n}$ is input to the arithmetic section 42 and the data $D_{3,n}$ stored by the storage section 41 is input to the arithmetic section 42, and a calculation of a difference ($D_{3,n}$–$D_{4,n}$) between these data $D_{3,n}$ and $D_{4,n}$ is carried out in the arithmetic section 42. Then, in the detecting section 40, it is detected whether or not light reaching the pixel units $P_{3,n}$ and $P_{4,n}$ is a blinking signal on the basis of the difference ($D_{3,n}$–$D_{4,n}$).

In the same way after that, in the detecting section 40, it is detected whether or not light reaching the pixel units $P_{2i-1,n}$ and $P_{2i,n}$ is a blinking signal on the basis of a difference between the data $D_{2i-1,n}$ and $D_{2i,n}$.

Figure 8:
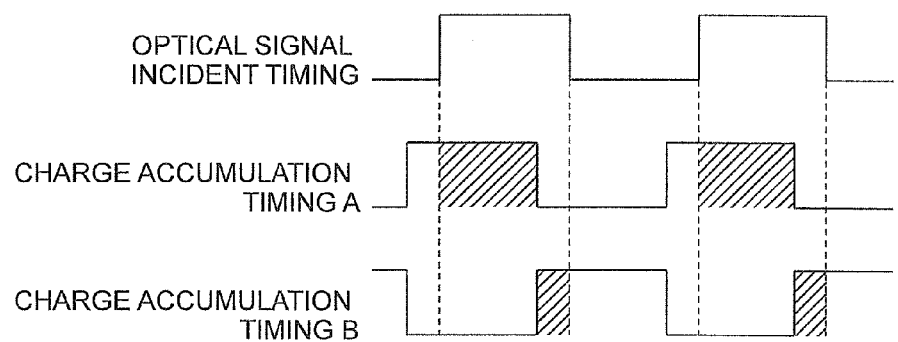
FIG. 8 is a diagram for explaining operation of the blinking-signal detecting device 1 according to the first embodiment.

FIG. 8 is a diagram for explaining operation of the blinking-signal detecting device 1 according to the first embodiment. This figure shows, in order from the top, the optical signal incident timing, the charge accumulation timing A in a pixel unit of the (2i–1)-th row in the light receiving section 10, and the charge accumulation timing B in a pixel unit of the 2i-th row in the light receiving section 10. In the previous FIG. 7, the charge accumulation timing A in a pixel unit of the (2i–1)-th row in the light receiving section 10 is matched to the optical signal incident timing. However, in this FIG. 8, the charge accumulation timings A and B are both partially overlapped with the optical signal incident timing. The respective phases of the charge accumulation timings A and B are different by half a cycle.

The areas shown by hatching in the figure show the areas on which the respective charge accumulation timings A and B are overlapped with the optical signal incident timing, which correspond to the sizes of the data $D_{2i-1,n}$ and $D_{2i,n}$. When a blinking signal has reached the pixel units $P_{2i-1,n}$ and $P_{2i,n}$, and the sizes of the hatched areas are different between the charge accumulation timings A and B, i.e., the difference ($D_{2i-1,n}$–$D_{2i,n}$) is not zero, it may be detected by the detecting section 40 that the blinking signal has reached. On the other hand, when light of a given intensity has reached the pixel units $P_{2i-1,n}$ and $P_{2i,n}$, the sizes of the hatched areas are equal to one another between the charge accumulation timings A and B, therefore, it may be detected by the detecting section 40 that the blinking signal has not reached.

In this way, it suffices for the blinking-signal detecting device 1 according to the present embodiment to merely include the storage section 41 storing data of one row, and a high-capacity storage section is not required. Further, the blinking-signal detecting device 1 according to the present embodiment is capable of specifying a pixel unit receiving a blinking signal such as an optical signal without a blinking pattern of an optical signal being known.

In addition, in order to detect a blinking optical signal as described above, it is necessary for the optical signal to reach at least two certain pixel units $P_{2i-1,n}$ and $P_{2i,n}$. For that, imaging onto a light receiving surface 10 by an optical system provided to the front surface of the light receiving section 10 may be purposely made fuzzy, to make the optical signal reach a wide range of the light receiving section 10. Further, when the intensity distributions of light reaching the light receiving section 10 are different between the neighboring rows, it may be detected by mistake that an optical signal has reached in some cases. However, imaging onto the light receiving surface 10 by the optical system is purposely made fuzzy, which makes it possible to prevent such a false detection.

Second Embodiment

Figure 9:
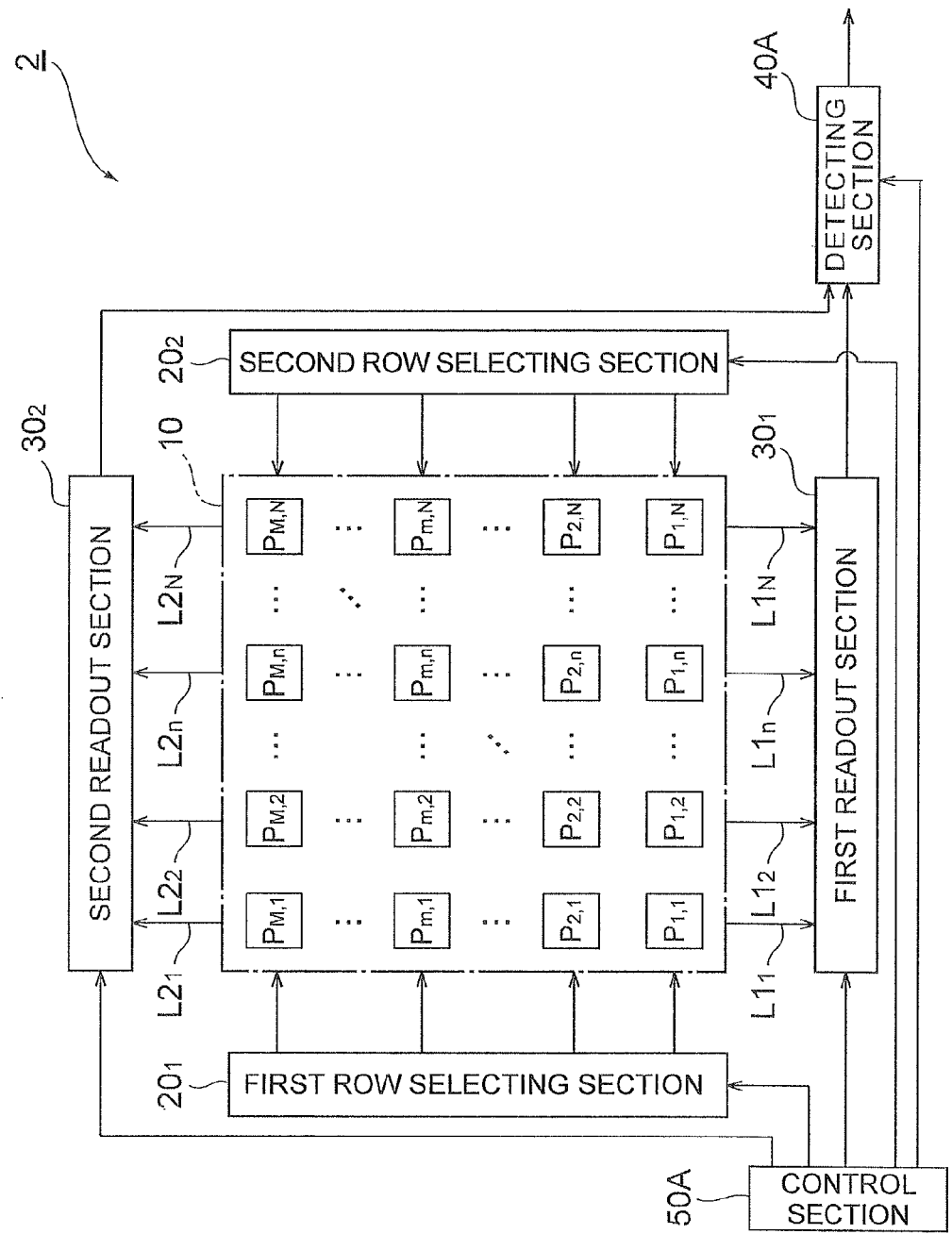
FIG. 9 is a diagram showing a schematic configuration of a blinking-signal detecting device 2 according to a second embodiment.

FIG. 9 is a diagram showing a schematic configuration of a blinking-signal detecting device 2 according to a second embodiment. The blinking-signal detecting device 2 shown in this figure includes the light receiving section 10, a first row selecting section $20_1$, a second row selecting section $20_2$, a first readout section $30_1$, a second readout section $30_2$, a detecting section 40A, and a control section 50A.

As compared with the configuration of the blinking-signal detecting device 1 according to the first embodiment shown in FIG. 1, the blinking-signal detecting device 2 according to the second embodiment shown in FIG. 9 is different in configuration of each pixel unit $P_{m,n}$ of the light receiving section 10, and is different in the point that the first row selecting section $20_1$ and the second row selecting section $20_2$ are included in place of the row selecting section 20, in the point that the first readout section $30_1$ and the second readout section $30_2$ are included in place of the readout section 30, in the point that the detecting section 40A is included in place of the detecting section 40, and in the point that the control section 50A is included in place of the control section 50.

The first row selecting section $20_1$ and the first readout section $30_1$ carry out discharge, charge accumulation, and data readout with respect to each pixel unit $P_{2i-1,n}$ of an odd-numbered row (the (2i−1)-th row) in the light receiving section 10. The second row selecting section $20_2$ and the second readout section $30_2$ carry out discharge, charge accumulation, and data readout with respect to each pixel unit $P_{2i,n}$ of an even-numbered row (the 2i-th row) in the light receiving section 10. The first row selecting section $20_1$ and the first readout section $30_1$, and the second row selecting section $20_2$ and the second readout section $30_2$ carry out operations for data readout in parallel with each other.

The control section 50A controls respective operations of the first row selecting section $20_1$, the second row selecting section $20_2$, the first readout section $30_1$, and the second readout section $30_2$ so as to carry out the above-described parallel operations. Further, because the above-described parallel operations are carried out, the detecting section 40A in the second embodiment has a configuration different from that of the detecting section 40 in the first embodiment. Further, in order to carry out the above-described parallel operations, each pixel unit $P_{m,n}$ in the second embodiment has a configuration different from that of each pixel unit in the first embodiment.

Figure 10:
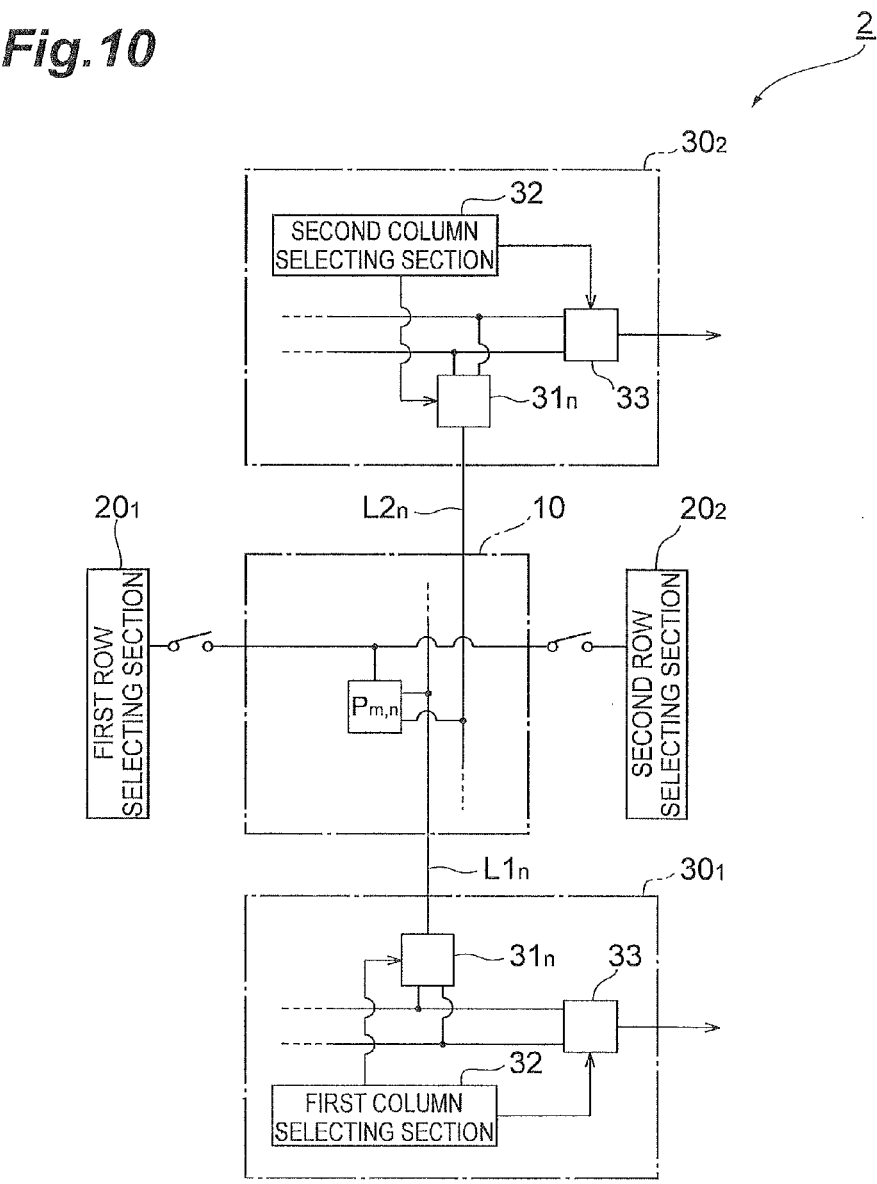
FIG. 10 is a diagram showing respective configurations of a first readout section $30_1$ and a second readout section $30_2$ of the blinking-signal detecting device 2 according to the second embodiment.

FIG. 10 is a diagram showing respective configurations of the first readout section $30_1$ and the second readout section $30_2$ of the blinking-signal detecting device 2 according to the second embodiment. In this figure, the pixel unit $P_{m,n}$ of the m-th row and the n-th column is shown as a representative of the M×N pixel units $P_{1,1}$ to $P_{M,N}$ in the light receiving section 10. Further, constitutional elements relating to the pixel unit $P_{m,n}$ are shown in each of the first readout section $30_1$ and the second readout section $30_2$.

Each of the first readout section $30_1$ and the second readout section $30_2$ has the same configuration as that of the readout section 30 in the first embodiment. However, each holding section $31_n$ in the first readout section $30_1$ is connected to M pixel units $P_{1,n}$ to $P_{M,n}$ of the n-th column in the light receiving section 10 via the readout signal line $L1_n$, and allows data output from the pixel unit $P_{m,n}$ of the m-th row selected by the first row selecting section $20_1$ to the readout signal line $L1_1$ to be input thereto, to hold the data, and is capable of outputting the held data. Further, each holding section $31_n$ in the second readout section $30_2$ is connected to M pixel units $P_{1,n}$ to $P_{M,n}$ of the n-th column in the light receiving section 10 via the readout signal line $L2_n$, and allows data output from the pixel unit $P_{m,n}$ of the m-th row selected by the second row selecting section $20_2$ to the readout signal line $L2_n$ to be input thereto, to hold the data, and is capable of outputting the held data.

Figure 11:
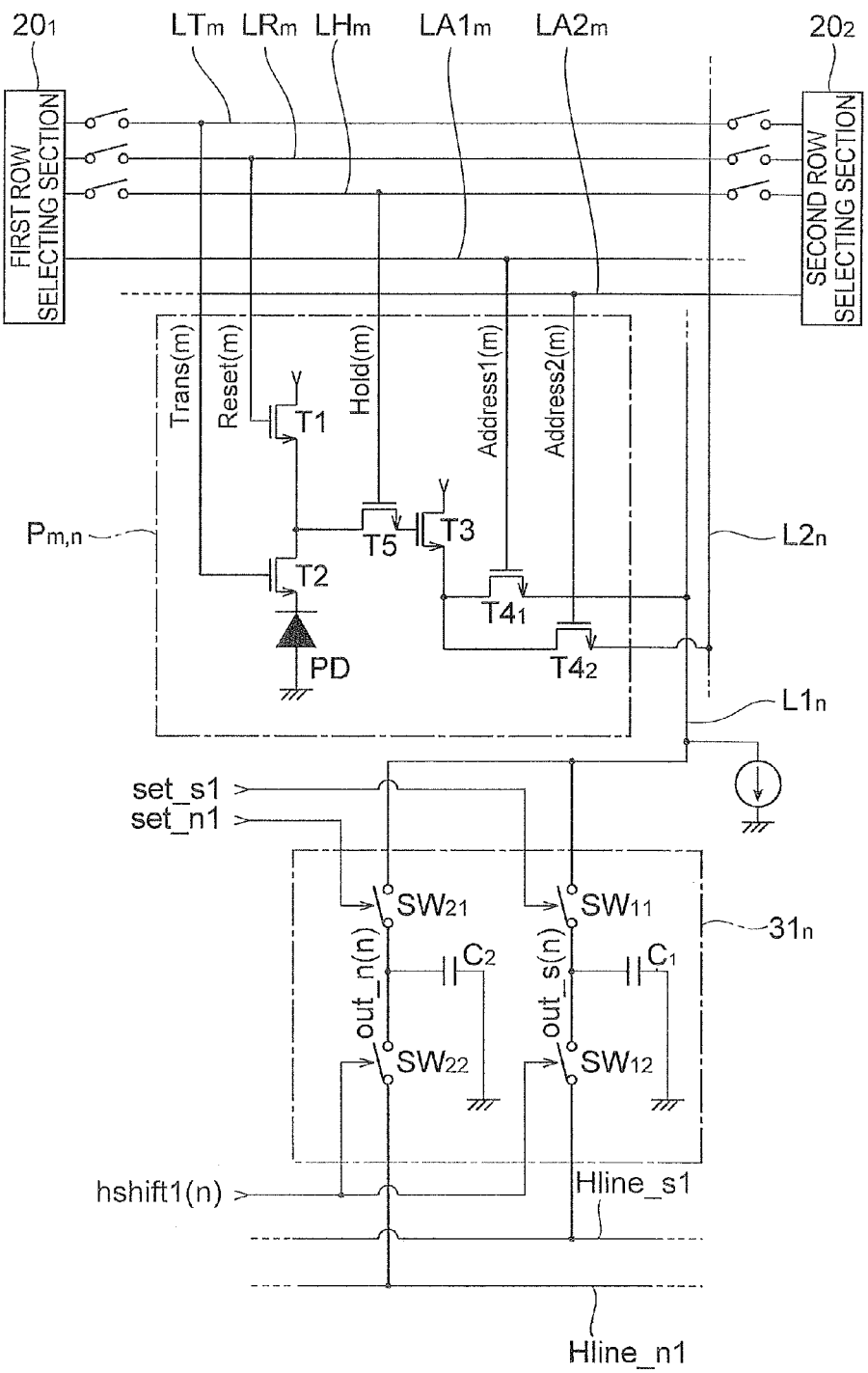
FIG. 11 is a diagram showing circuit configurations of a pixel unit $P_{m,n}$ and a holding section $31_n$ of the first readout section $30_1$ of the blinking-signal detecting device 2 according to the second embodiment.

FIG. 11 is a diagram showing circuit configurations of the pixel unit $P_{m,n}$ and the holding section $31_n$ of the first readout section $30_1$ of the blinking-signal detecting device 2 according to the second embodiment. In this figure as well, the pixel unit $P_{m,n}$ of the m-th row and the n-th column is shown as a representative of the M×N pixel units $P_{1,1}$ to $P_{M,N}$ in the light receiving section 10. Further, the holding section $31_n$ relating to the pixel unit $P_{m,n}$ is shown in the first readout section $30_1$.

Each pixel unit $P_{m,n}$ is of the APS (Active Pixel Sensor) type, that includes a photodiode PD and 6 MOS transistors T1, T2, T3, $T4_1$, $T4_2$, and T5. As shown in this figure, the transistor T1, the transistor T2, and the photodiode PD are sequentially connected in series, and a reference voltage is input to the drain terminal of the transistor T1, and the anode terminal of the photodiode PD is grounded. The connection point between the transistor T1 and the transistor T2 is connected to the gate terminal of the transistor T3 via the transistor T5.

A reference voltage is input to the drain terminal of the transistor T3. The source terminal of the transistor T3 is connected to the respective drain terminals of the transistors $T4_1$ and $T4_2$. The source terminal of the transistor $T4_1$ of each pixel unit $P_{m,n}$ is connected to the readout signal line $L1_n$. The source terminal of the transistor $T4_2$ of each pixel unit $P_{m,n}$ is connected to the readout signal line $L2_n$. A constant current source is connected to the readout signal line $L1_n$ and the readout signal line $L2_n$, respectively.

The gate terminal of the transistor T2 for transfer in each pixel unit $P_{m,n}$ is connected to a control signal line $LT_m$, and a Trans(m) signal output from the first row selecting section $20_1$ or the second row selecting section $20_2$ is input thereto. The gate terminal of the transistor T1 for reset in each pixel unit $P_{m,n}$ is connected to a control signal line $LR_m$, and a Reset(m) signal output from the first row selecting section $20_1$ or the second row selecting section $20_2$ is input thereto. The gate terminal of the transistor T5 for hold in each pixel unit $P_{m,n}$ is connected to a control signal line $LH_m$, and a Hold(m) signal output from the first row selecting section $20_1$ or the second row selecting section $20_2$ is input thereto.

The gate terminal of the transistor $T4_1$ for output selection in each pixel unit $P_{m,n}$ is connected to a control signal line $LA1_m$, and an Address1(m) signal output from the first row selecting section $20_1$ is input thereto. The gate terminal of the transistor $T4_2$ for output selection in each pixel unit $P_{m,n}$ is connected to a control signal line $LA2_m$, and an Address2(m) signal output from the second row selecting section $20_2$ is input thereto. These control signals (Reset(m) signal, Trans (m) signal, Hold(m) signal, Address 1(m) signal, and Address2(m) signal) are input in common to the N pixel units $P_{m,1}$ to $P_{m,N}$ of the m-th row.

The control signal line $LT_m$, the control signal line $LR_m$, and the control signal line $LH_m$ are provided to every row, and the control signals (Reset(m) signal, Trans(m) signal, and Hold(m) signal) giving instructions for discharge from each of the junction capacitance section of the photodiode PD in each pixel unit $P_{m,n}$ of the m-th row and the charge accumulating section, and for charge accumulation by the charge accumulating section are transmitted therethrough. The first terminals of these control signal lines are connected to the first row selecting section $20_1$ via switches. Further, the second terminals of these control signal lines are connected to the second row selecting section $20_2$ via switches. The two switches provided to the both terminals of each of these control signal lines do not close at the same time, and at least one of these is always open. In addition, tri-state buffers may be used in place of these switches. In this case, the two tri-state buffers provided to the both terminals of each of these control signal lines are not brought into a conduction state at the same time, and at least one of these is always in a high-impedance state.

The control signal line $LA1_m$ and the control signal line $LA2_m$ are provided to every row, and the control signals (Address1(m) signal and Address2(m) signal) for giving instructions for data output to the readout signal line $L1_n$ or the readout signal line $L2_n$ in each pixel unit $P_{m,n}$ of the m-th row are transmitted therethrough. Each control signal line $LA1_m$ is connected to the first row selecting section $20_1$. Each control signal line $LA2_m$ is connected to the second row selecting section $20_2$. The Address1(m) signal and the Address2(m) signal are not shifted to a high level simultaneously, and the transistor $T4_1$ and the transistor $T4_2$ do not move into an on-state simultaneously.

When the Reset(m) signal, the Trans(m) signal, and the Hold(m) signal are at a high level, the junction capacitance section of the photodiode PD is discharged, and further, the diffusion region (the charge accumulating section) connected to the gate terminal of the transistor T3 is discharged. When the Trans(m) signal is at a low level, the charge generated in the photodiode PD is accumulated in the junction capacitance section. When the Reset(m) signal is at a low level and the Trans(m) signal and the Hold(m) signal are at a high level, the charge accumulated in the junction capacitance section of the photodiode PD is transferred to the diffusion region (the charge accumulating section) connected to the gate terminal of the transistor T3 to be accumulated therein.

When the Address1(m) signal is at a high level, data (data of signal components superimposed with noise components) corresponding to an amount of the charge accumulated in the diffusion region (the charge accumulating section) connected to the gate terminal of the transistor T3 is output to the readout signal line $L1_n$ via the transistor $T4_1$, to be input to the holding section $31_n$ of the first readout section $30_1$. That is, the transistor $T4_1$ operates as a first switch for outputting data corresponding to an accumulated charge amount in the charge accumulating section to the readout signal line $L1_n$. In addition, when the charge accumulating section is in a state of discharge, data of only noise components is output to the readout signal line $L1_n$ via the transistor $T4_1$.

When the Address2(m) signal is at a high level, data (data of signal components superimposed with noise components) corresponding to an amount of the charge accumulated in the diffusion region (the charge accumulating section) connected to the gate terminal of the transistor T3 is output to the readout signal line $L2_n$ via the transistor $T4_2$, to be input to the holding section $31_n$ of the second readout section $30_2$. That is, the transistor $T4_2$ operates as a second switch for outputting data corresponding to an accumulated charge amount in the charge accumulating section to the readout signal line $L2_n$. In addition, when the charge accumulating section is in a state of discharge, data of only noise components is output to the readout signal line $L2_n$ via the transistor $T4_2$.

Each of the first row selecting section $20_1$ and the second row selecting section $20_2$ has an M-staged shift register. The M-staged shift register of the first row selecting section $20_1$ outputs an Address1(m) signal from the m-th stage among the stages to the control signal line $LA1_m$, to provide the signal to each pixel unit $P_{m,n}$ of the m-th row. The M-staged shift register of the second row selecting section $20_2$ outputs an Address2(m) signal from the m-th stage among the stages to the control signal line $LA2_m$, to provide the signal to each pixel unit $P_{m,n}$ of the m-th row. Further, the first row selecting section $20_1$ has a circuit shown in FIG. 5(a) with respect to each odd-numbered row (the (2i−1)-th row), and the second row selecting section $20_2$ has a circuit shown in FIG. 5(b) with respect to each even-numbered row (the 2i-th row).

The first row selecting section $20_1$ is capable of causing each pixel unit $P_{2i-1,n}$ of the (2i−1)-th row in the light receiving section 10 to accumulate charge generated in the photodiode in the charge accumulating section during a first period instructed by the S_odd signal. Further, the second row selecting section $20_2$ is capable of causing each pixel unit $P_{2i,n}$ of the 2i-th row in the light receiving section 10 to accumulate charge generated in the photodiode in the charge accumulating section during a second period instructed by the S_even signal. The timings for discharge and charge accumulation in each pixel unit $P_{2i,n}$ are the same as those in the case of the first embodiment.

The first row selecting section $20_1$ selects an odd-numbered row (the (2i−1)-th row) in the light receiving section 10 by an Address1(2i−1) signal after the first period and the second period, and is capable of causing each pixel unit $P_{2i-1,n}$ Of every row to output data corresponding to an accumulated charge amount in the charge accumulating section to the readout signal line $L1_n$. The second row selecting section $20_2$ selects an even-numbered row (the 2i-th row) in the light receiving section 10 by an Address2(2i) signal after the first period and the second period, and is capable of causing each pixel unit $P_{2i,n}$ of every row to output data corresponding to an accumulated charge amount in the charge accumulating section to the readout signal line $L2_n$. Data readout from each pixel unit $P_{2i-1,n}$ of the (2i−1)-th row to the detecting section 40A via the readout signal line $L1_n$ and the first readout section $30_1$ and data readout from each pixel unit $P_{2i,n}$ of the 2i-th row to the detecting section 40A via the readout signal line $L2_n$ and the second readout section $30_2$ are carried out in parallel with each other.

That is, the first row selecting section $20_1$ and the second row selecting section $20_2$ simultaneously select the (2i−1)-th row and the 2i-th row in the light receiving section 10, and cause these lines to output data corresponding to an accumulated charge amount in the charge accumulating section of each pixel unit $P_{2i-1,n}$ Of the (2i−1)-th row, and to output data corresponding to an accumulated charge amount in the charge accumulating section of each pixel unit $P_{2i,n}$ of the 2i-th row. That first readout section $30_1$ and the second readout section $30_2$ simultaneously output data $D_{2i-1,n}$ corresponding to an amount of charge generated in the photodiode of each pixel unit $P_{2i-1, n}$ of the (2i−1)-th row and data $D_{2i,n}$ corresponding to an amount of charge generated in the photodiode of each pixel unit $P_{2i,n}$ of the 2i-th row, to the detecting section 40A.

The detecting section 40A carries out a calculation of a difference between the data $D_{2i-1,n}$ and $D_{2i,n}$ output simultaneously from the readout sections $30_1$ and $30_2$, and detects whether or not light reaching the pixel units $P_{2i-1,n}$ and $P_{2i,n}$ is a blinking signal on the basis of the difference.

The blinking-signal detecting device 2 according to the second embodiment operates as follows. During the first period for which an optical signal is incident upon the light receiving section 10, the charge generated in the photodiode PD in each pixel unit $P_{2i-1,n}$ of the (2i−1)-th row is transferred to the diffusion region (charge accumulating section) connected to the gate terminal of the transistor T3 to be accumulated therein by the first row selecting section $20_1$. These operations are performed in parallel in each pixel unit of all the odd-numbered rows in the light receiving section 10.

Further, during the second period for which no optical signal is incident upon the light receiving section 10, the charge generated in the photodiode PD in each pixel unit $P_{2i,n}$ of the 2i-th row is transferred to the diffusion region (charge accumulating section) connected to the gate terminal of the transistor T3 to be accumulated therein by the second row selecting section $20_2$. These operations are performed in parallel in each pixel unit of all the even-numbered rows in the light receiving section 10.

The timing for charge accumulation in each of these pixel unit $P_{m,n}$ is the same as that in the case of the first embodiment. The timing for a data readout operation in the second embodiment is different from that in the case of the first embodiment.

In the second embodiment, after the first period and the second period, an Address1(1) signal provided from the first row selecting section $20_1$ to each pixel unit $P_{1,n}$ of the first row and an Address2(2) signal provided from the second row selecting section $20_2$ to each pixel unit $P_{2,n}$ of the second row are shifted to a high level during a same period. Then, output of data $D_{1,n}$ of each pixel unit $P_{1,n}$ of the first row from the first readout section $30_1$ and output of data $D_{2,n}$ of each pixel unit $P_{2,n}$ of the second row from the second readout section $30_2$ are carried out simultaneously. In the detecting section 40A, the data $D_{1,n}$ of each pixel unit $P_{1,n}$ of the first row and the data $D_{2,n}$ of each pixel unit $P_{2,n}$ of the second row are input simultaneously, and a calculation of a difference $(D_{1,n}-D_{2,n})$ between these data $D_{1,n}$ and $D_{2,n}$ is carried out. Then, in the detecting section 40A, it is detected whether or not light reaching the pixel units $P_{1,n}$ and $P_{2,n}$ is a blinking signal on the basis of the difference $(D_{1,n}-D_{2,n})$.

Next, an Address1(3) signal provided from the first row selecting section $20_1$ to each pixel unit $P_{3,n}$ of the third row and an Address2(4) signal provided from the second row selecting section $20_2$ to each pixel unit $P_{4,n}$ of the fourth row are shifted to a high level during a same period. Then, output of data $D_{3,n}$ of each pixel unit $P_{3,n}$ of the third row from the first readout section $30_1$ and output of data $D_{4,n}$ of each pixel unit $P_{4,n}$ of the fourth row from the second readout section $30_2$ are carried out simultaneously. In the detecting section 40A, the data $D_{3,n}$ of each pixel unit $P_{3,n}$ of the third row and the data $D_{4,n}$ of each pixel unit $P_{4,n}$ of the fourth row are input simultaneously, and a calculation of a difference $(D_{3,n}-D_{4,n})$ between these data $D_{3,n}$ and $D_{4,n}$ is carried out. Then, in the detecting section 40A, it is detected whether or not light reaching the pixel units $P_{3,n}$ and $P_{4,n}$ is a blinking signal on the basis of the difference $(D_{3,n}-D_{4,n})$.

In the same way after that, in the detecting section 40A, it is detected whether or not light reaching the pixel units $P_{2i-1,n}$ and $P_{2i,n}$ is a blinking signal on the basis of a difference $(D_{2i-1,n}-D_{2i,n})$ between the data $D_{2i-1,n}$ and $D_{2i,n}$.

It is necessary for the blinking-signal detecting device 1 according to the first embodiment to include the storage section 41 storing data of one row. However, there is no need for the blinking-signal detecting device 2 according to the second embodiment to include such a storage section. Further, the blinking-signal detecting device 2 according to the second embodiment is capable of specifying a pixel unit receiving a blinking signal such as an optical signal without a blinking pattern of an optical signal being known in the same way as in the case of the first embodiment.

Third Embodiment

Figure 12:
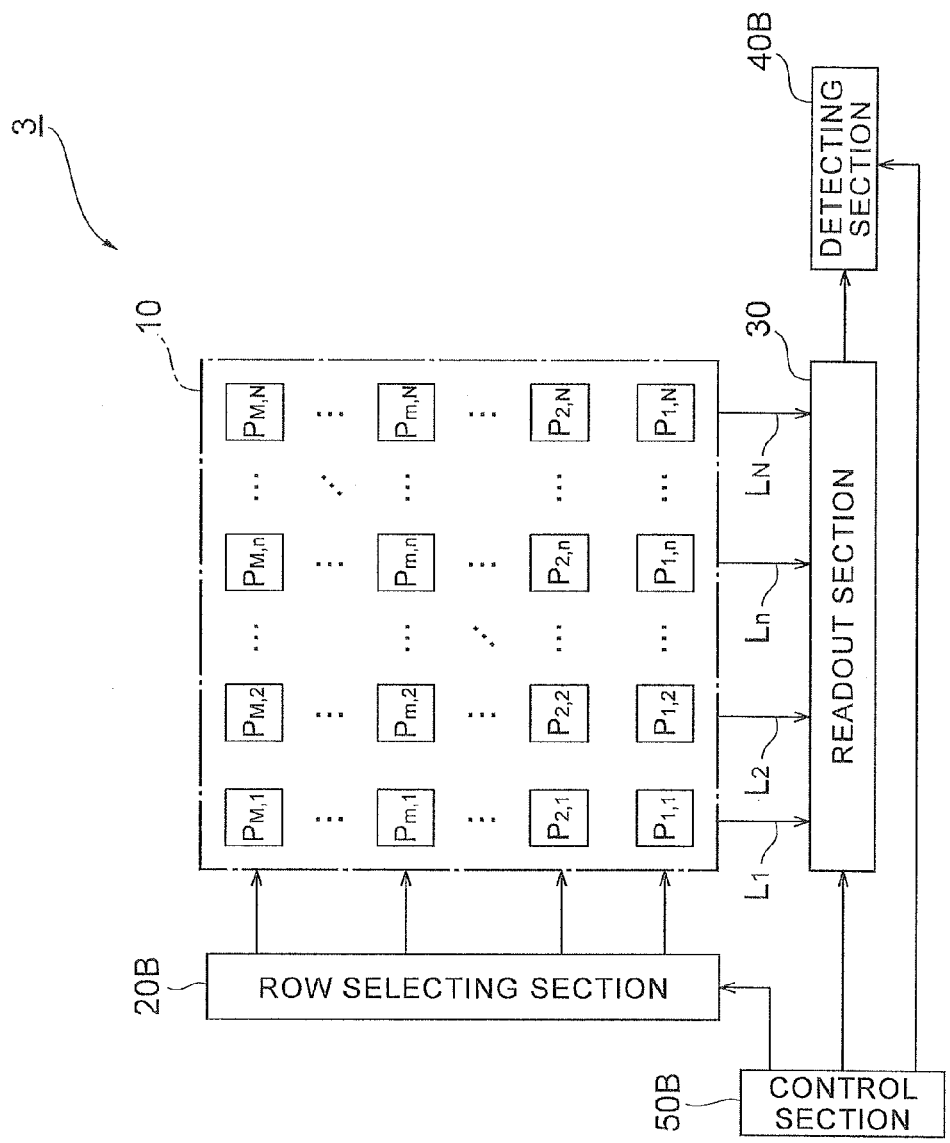
FIG. 12 is a diagram showing a schematic configuration of a blinking-signal detecting device 3 according to a third embodiment.

FIG. 12 is a diagram showing a schematic configuration of a blinking-signal detecting device 3 according to a third embodiment. The blinking-signal detecting device 3 shown in this figure includes the light receiving section 10, a row selecting section 20B, the readout section 30, and a detecting section 40B, and a control section 50B.

As compared with the configuration of the blinking-signal detecting device 1 according to the first embodiment shown in FIG. 1, the blinking-signal detecting device 3 according to the third embodiment shown in FIG. 12 is different in the point that the row selecting section 20B is included in place of the row selecting section 20, in the point that the detecting section 40B is included in place of the detecting section 40, and in the point that the control section 50B is included in place of the control section 50.

The row selecting section 20B outputs various control signals for controlling the operation of each pixel unit $P_{m,n}$ in the light receiving section 10. In more detail, the row selecting section 20B causes each pixel unit $P_{4j-3,n}$ of the (4j−3)-th row in the light receiving section 10 to accumulate charge generated in the photodiode PD in the charge accumulating section during a first period. The row selecting section 20B causes each pixel unit $P_{4j-2,n}$ of the (4j−2)-th row in the light receiving section 10 to accumulate charge generated in the photodiode PD in the charge accumulating section during a second period.

The row selecting section 20B causes each pixel unit $P_{4j-1,n}$ of the (4j−1)-th row in the light receiving section 10 to accumulate charge generated in the photodiode PD in the charge accumulating section during a third period. Further, the row selecting section 20B causes each pixel unit $P_{4j,n}$ of the 4j-th row in the light receiving section 10 to accumulate charge generated in the photodiode PD in the charge accumulating section during a fourth period. Then, the row selecting section 20B selects each row in the light receiving section 10 after the fourth period, and causes each pixel unit $P_{m,n}$ of every row to output data corresponding to an accumulated charge amount in the charge accumulating section. Here, the first to fourth periods are set in this order, and have a common temporal width. Further, j is each integer not less than 1 and not more than (M/4).

The readout section 30 is connected to N readout signal lines $L_1$ to $L_N$, and allows data output from each pixel unit $P_{m,n}$ of the m-th row in the light receiving section 10 selected by the row selecting section 20 to the readout signal line $L_n$ to be input thereto, and outputs data $D_{m,n}$ corresponding to an amount of charge generated in its photodiode of each pixel unit $P_{m,n}$ of the m-th row to the detecting section 40B.

The detecting section 40B allows each data $D_{m,n}$ output from the readout section 30 to be input thereto, and detects whether or not light reaching the pixel units $P_{4j-3,n}$, $P_{4j-2,n}$, $P_{4j-1,n}$, and $P_{4j,n}$ is a blinking signal on the basis of a sum of a difference between the data $D_{4j-3,n}$ and $D_{4j-1,n}$ and a difference between the data $D_{4j-2,n}$ and $D_{4j,n}$.

The control section 50B controls respective operations of the row selecting section 20B, the readout section 30, and the detecting section 40B, to control the entire operation of the blinking-signal detecting device 1. In more detail, the control section 50B controls transmission of various control signals to the light receiving section 10 in the row selecting section 20B, input of data from each pixel unit $P_{m,n}$ in the readout section 30, output of each data $D_{m,n}$ in the readout section 30, processing in the detecting section 40B, and respective operational timings.

Figure 13:
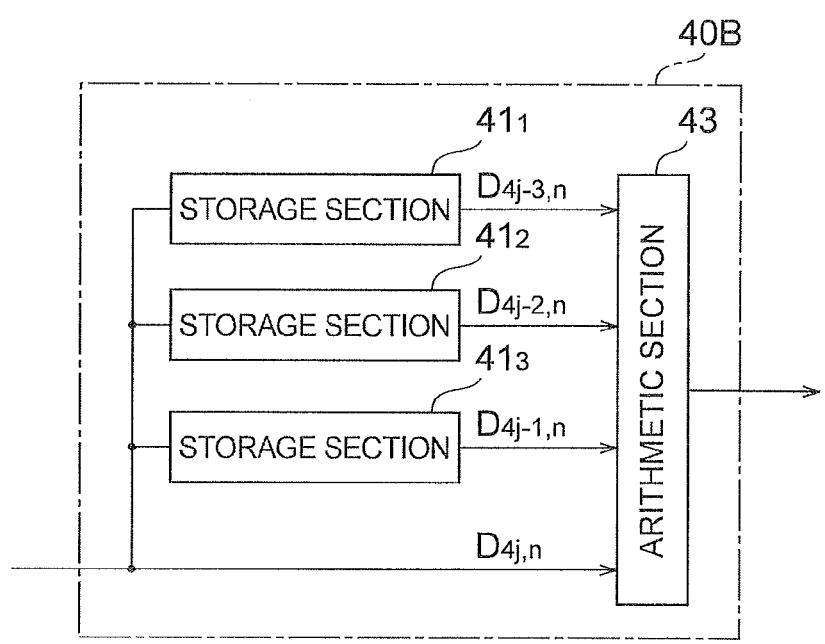
FIG. 13 is a diagram showing a configuration of a detecting section 40B of the blinking-signal detecting device 3 according to the third embodiment.

FIG. 13 is a diagram showing a configuration of the detecting section 40B of the blinking-signal detecting device 3 according to the third embodiment. The detecting section 40B allows each data $D_{m,n}$ output in order of the rows from the readout section 30 to be input thereto. The detecting section 40B includes storage sections $41_1$ to $41_3$ and an arithmetic section 43. The storage section $41_1$ stores N data $D_{4j-3,n}$ of the (4j−3)-th row. The storage section $41_2$ stores N data $D_{4j-2,n}$ of the (4j−2)-th row. The storage section $41_3$ stores N data $D_{4j-1,n}$ of the (4j−1)-th row.

The arithmetic section 43 allows N data $D_{4j,n}$ of the 4j-th row to be input thereto, and allows N data $D_{4j-3,n}$ of the (4j−3)-th row, N data $D_{4j-2,n}$ of the (4j−2)-th row, and N data $D_{4j-1,n}$ of the (4j−1)-th row which are stored by the storage sections $41_1$ to $41_3$, to be input thereto. Then, the arithmetic section 43 determines a sum S $(=|D_{4j-3,n}-D_{4j-1,n}|+|D_{4j-2,n}-D_{4j,n}|)$ of a difference between the data $D_{4j-3,n}$ and $D_{4j-1,n}$ and a difference between the data $D_{4j-2,n}$ and $D_{4j,n}$, and detects whether or not light reaching the pixel units $P_{4j-3,n}$, $P_{4j-2,n}$, $P_{4j-1,n}$, and $P_{4j,n}$ is a blinking signal on the basis of the arithmetic result S.

Figure 14:
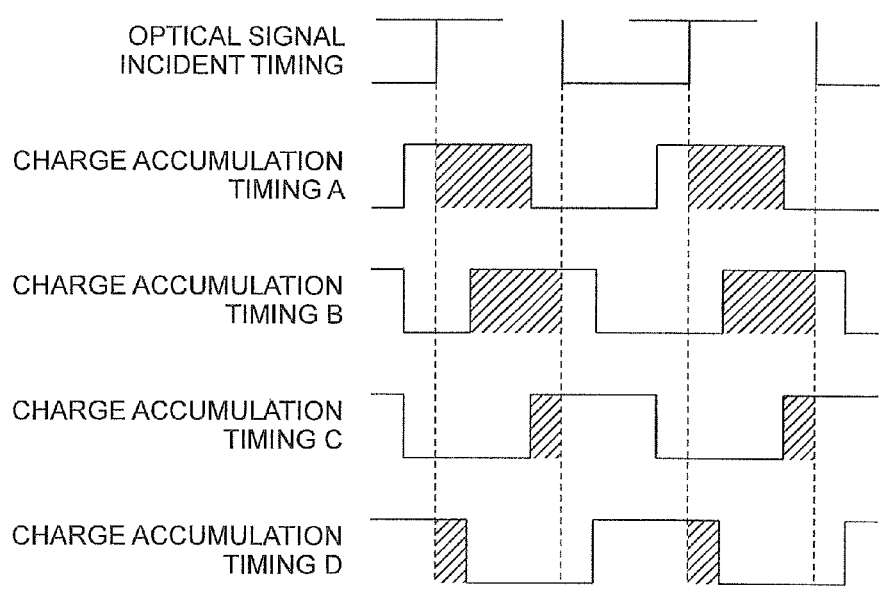
FIG. 14 is a diagram for explaining operation of the blinking-signal detecting device 3 according to the third embodiment.

FIG. 14 is a diagram for explaining operation of the blinking-signal detecting device 3 according to the third embodiment. This figure shows, in order from the top, the optical signal incident timing, the charge accumulation timing A in a pixel unit of the (4j−3)-th row in the light receiving section 10, the charge accumulation timing B in a pixel unit of the (4j−2)-th row in the light receiving section 10, the charge accumulation timing C in a pixel unit of the (4j−1)-th row in the light receiving section 10, and the charge accumulation timing D in a pixel unit of the 4j-th row in the light receiving section 10. In this figure, the charge accumulation timings A to D and the optical signal incident timing have the same cycle, and any of the charge accumulation timings A to D is partially overlapped with the optical signal incident timing. The respective phases of the charge accumulation timings A to D are different by a quarter-cycle.

The areas shown by hatching in the figure show the areas on which each of the charge accumulation timings A to D is overlapped with the optical signal incident timing, which correspond to the sizes of the data $D_{4j-3,n}$, $D_{4j-2,n}$, $D_{4j-1,n}$, and $D_{4j,n}$. When a blinking signal has reached the pixel units $P_{4j-3,n}$, $P_{4j-2,n}$, $P_{4j-1,n}$, and $P_{4j,n}$, the arithmetic result S by the arithmetic section 43 is not zero. Therefore, it may be detected by the detecting section 40B that a blinking signal has reached. On the other hand, when light of a given intensity has reached the pixel units $P_{4j-3,n}$, $P_{4j-2,n}$, $P_{4j-1,n}$, and $P_{4j,n}$, the arithmetic result S by the arithmetic section 43 is zero. Therefore, it may be detected by the detecting section 40B that the blinking signal has not reached.

In particular, in the present embodiment, the arithmetic result S by the arithmetic section 43 is not dependent on a phase difference between the optical signal incident timing and the charge accumulation timings A to D. Therefore, in the present embodiment, it is possible to carry out high-sensitive blinking-signal detection regardless of this phase difference.

In this way, it suffices for the blinking-signal detecting device 3 according to the present embodiment to merely include the storage sections 41₁ to 41₃ storing data of three rows, and a high-capacity storage section is not required. Further, the blinking-signal detecting device 3 according to the present embodiment is capable of specifying a pixel unit receiving a blinking signal such as an optical signal without a blinking pattern of an optical signal being known.

Further, the present invention is not limited to the respective first to third embodiments. For example, the diffusion region connected to the gate terminal of the transistor T3 is exemplified as a charge accumulating section in the above-described embodiments. However, a photodiode may also function as a charge accumulating section.

INDUSTRIAL APPLICABILITY

The present invention is applicable to usage for specifying a pixel unit receiving a blinking signal such as an optical signal without a high-capacity storage section, and without a blinking pattern of an optical signal being known.

REFERENCE SIGNS LIST

1 to 3 . . . blinking-signal detecting device, 10 . . . light receiving section, 20, 20₁, 20₂, 20B . . . row selecting section, 30, 30₁, 30₂ . . . readout section, 31₁ to 31ₙ . . . holding section, 32 . . . column selecting section, 33 . . . difference arithmetic section, 40, 40A, 40B . . . detecting section, 41, 41₁ to 41₃ . . . storage section, 42, 43 . . . arithmetic section, 50, 50A, 50B . . . control section, $P_{1,1}$ to $P_{M,N}$ . . . pixel unit, $L_1$ to $L_N$, $L1_1$ to $L1_N$, $L2_1$ to $L2_N$ . . . readout signal line, $LT_1$ to $LT_M$, $LR_1$ to $LR_M$, $LH_1$ to $LH_M$, $LA1_1$ to $LA1_M$, $LA2_1$ to $LA2_M$ . . . control signal line

The invention claimed is:
1. A blinking-signal detecting device comprising:
a light receiving section where M×N pixel units $P_{1,1}$ to $P_{M,N}$ each including a photodiode that generates charge of an amount according to an incident light amount, a charge accumulating section in which the charge is accumulated, and a switch for outputting data corresponding to an accumulated charge amount in the charge accumulating section are two-dimensionally arrayed in M rows and N columns;
a row selecting section in which a first period and a second period having a common temporal width are set in tandem, the row selecting section causes each pixel unit $P_{2i-1,n}$ of a (2i−1)-th row in the light receiving section to accumulate charge generated in the photodiode in the charge accumulating section during the first period, and causes each pixel unit $P_{2i,n}$ of a 2i-th row in the light receiving section to accumulate charge generated in the photodiode in the charge accumulating section during the second period, and selects each row in the light receiving section after the first period and the second period, to close the switch of each pixel unit $P_{m,n}$ of every row so as to output data corresponding to an accumulated charge amount in the charge accumulating section;
a readout section for which data output from each pixel unit $P_{m,n}$ of each row in the light receiving section selected by the row selecting section is input, and from which data $D_{m,n}$ corresponding to an amount of charge generated in the photodiode of each pixel unit $P_{m,n}$ is output; and
a detecting section for which each data $D_{m,n}$ output from the readout section is input, the detecting section detects whether or not light reaching the pixel units $P_{2i-1,n}$ and $P_{2i,n}$ is a blinking signal on the basis of a difference between data $D_{2i-1,n}$ and $D_{2i,n}$ provided that M and N are each an integer not less than 2, m is an integer not less than 1 and not more than M, and n is an integer not less than 1 and not more than N, and i is an integer not less than 1 and not more than (M/2).
2. The blinking-signal detecting device according to claim 1, wherein
the row selecting section simultaneously selects the (2i−1)-th row and the 2i-th row in the light receiving section, to output data corresponding to an accumulated charge amount in the charge accumulating section of each pixel unit $P_{2i-1,n}$ of the (2i−1)-th row, and to output data corresponding to an accumulated charge amount in the charge accumulating section of each pixel unit $P_{2i,n}$ of the 2i-th row,
the readout section simultaneously outputs data $D_{2i-1,n}$ corresponding to an amount of charge generated in the photodiode of each pixel unit $P_{2i-1,n}$ of the (2i−1)-th row, and data $D_{2i,n}$ corresponding to an amount of charge generated in the photodiode of each pixel unit $P_{2i,n}$ of the 2i-th row, and
the detecting section carries out a calculation of a difference between the data $D_{2i-1,n}$ and $D_{2i}$ simultaneously output from the readout section.
3. A blinking-signal detecting device comprising:
a light receiving section where M×N pixel units $P_{1,1}$ to $P_{M,N}$ each including a photodiode that generates charge of an amount according to an incident light amount, a charge accumulating section in which the charge is accumulated, and a switch for outputting data corresponding to an accumulated charge amount in the charge accumulating section are two-dimensionally arrayed in M rows and N columns;

a row selecting section in which first to fourth periods having a common temporal width are set in order, the row selecting section causes each pixel unit $P_{4j-3,n}$ of a (4j−3)-th row in the light receiving section to accumulate charge generated in the photodiode in the charge accumulating section during the first period, causes each pixel unit $P_{4j-2,n}$ of a (4j−2)-th row in the light receiving section to accumulate charge generated in the photodiode in the charge accumulating section during the second period, causes each pixel unit $P_{4j-1,n}$ of a (4j−1)-th row in the light receiving section to accumulate charge generated in the photodiode in the charge accumulating section during the third period, causes each pixel unit $P_{4j,n}$ of a 4j-th row in the light receiving section to accumulate charge generated in the photodiode in the charge accumulating section during the fourth period, and selects each row in the light receiving section after the fourth period, to close the switch of each pixel unit $P_{m,n}$ of every row so as to output data corresponding to an accumulated charge amount in the charge accumulating section;

a readout section for which data output from each pixel unit $P_{m,n}$ of each row in the light receiving section selected by the row selecting section is input, and from which data $D_{m,n}$ corresponding to an amount of charge generated in the photodiode of each pixel unit $P_{m,n}$ is output; and a detecting section for which each data $D_{m,n}$ output from the readout section is input, the detecting section detects whether or not light reaching the pixel units $P_{4j-3,n}$, $P_{4j-2,n}$, $P_{4j-1,n}$, and $P_{4j,n}$ is a blinking signal on the basis of a sum of a difference between data $D_{4j-3,n}$ and $D_{4j-1,n}$ and a difference between data $D_{4j-2,n}$ and $D_{4j,n}$ provided that M and N are each an integer not less than 2, m is an integer not less than 1 and not more than M, n is an integer not less than 1 and not more than N, and j is an integer not less than 1 and not more than (M/4).

* * * * *